March 26, 1968 D. C. HUGHES 3,375,055

CARTRIDGE TYPE SOUND MOTION PICTURE PROJECTOR

Filed Aug. 18, 1965 8 Sheets-Sheet 1

INVENTOR.
DAVID C. HUGHES
BY Amster & Rothstein
ATTORNEYS

March 26, 1968 D. C. HUGHES 3,375,055

CARTRIDGE TYPE SOUND MOTION PICTURE PROJECTOR

Filed Aug. 18, 1965 8 Sheets-Sheet 2

INVENTOR.
DAVID C. HUGHES
BY Amster & Rothstein
ATTORNEYS

INVENTOR.
DAVID C. HUGHES
BY Amster & Rothstein
ATTORNEYS

INVENTOR.
DAVID C. HUGHES
BY
Amster & Rothstein
ATTORNEYS

March 26, 1968 D. C. HUGHES 3,375,055

CARTRIDGE TYPE SOUND MOTION PICTURE PROJECTOR

Filed Aug. 18, 1965 8 Sheets-Sheet 5

INVENTOR.
DAVID C. HUGHES
BY
Amster & Rothstein
ATTORNEYS

INVENTOR.
DAVID C. HUGHES
BY
Amster & Rothstein
ATTORNEYS

March 26, 1968 D. C. HUGHES 3,375,055

CARTRIDGE TYPE SOUND MOTION PICTURE PROJECTOR

Filed Aug. 18, 1965 8 Sheets-Sheet 7

INVENTOR.
DAVID C. HUGHES
BY
Amster & Rothstein
ATTORNEYS

United States Patent Office 3,375,055 Patented Mar. 26, 1968

3,375,055

CARTRIDGE TYPE SOUND MOTION PICTURE PROJECTOR

David Colson Hughes, White Plains, N.Y., assignor, by mesne assignments, to Bohn Benton Inc., New York, N.Y., a corporation of New York Continuation-in-part of application Ser. No. 417,760, Dec. 11, 1964. This application Aug. 18, 1965, Ser. No. 480,600
11 Claims. (Cl. 352—72)

ABSTRACT OF THE DISCLOSURE

A sound motion picture projector which is cartridge loaded, including a projector mechanism and a foldable rear screen assembly contained within a readily portable carrying case.

This is a continuation-in-part of application Ser. No. 417,760 filed Dec. 11, 1964, and entitled "Cartridge Type Sound Motion Picture Projector." The present invention relates generally to motion picture projectors and, in particular, to a cartridge-loaded sound motion picture projector. Advantageously, the present invention provides a highly compact, self-sufficient portable sound motion picture projector system intended for rear projection.

A conventional motion picture projector system includes the usual film having sprocket holes along one edge thereof which may be provided with an optical or magnetic sound track. The film is wound upon a supply reel and is adapted to be rewound onto a takeup reel after passing through the projector mechanisms. To project the film, the supply reel must be mounted on a supply spindle, the takeup reel mounted on a takeup spindle and the film threaded along an elaborate path through the projector including multiple sprockets, pressure plate, guides and a film gate. Of recent times, self-threading projectors have become available and new projector types have been developed wherein the film is contained within a cartridge in the form of a continuous loop.

With the increasing applications of audio-visual teaching, training and selling devices, sound motion picture projectors are employed in the home, in schools and in industry. Often the projector must be operated by a student, teacher, salesman or other person ordinarily inexperienced in the threading and operation of motion picture projectors. These persons frequently have difficulty in properly threading the film, operating the projector, setting up the screen and attending to elaborate procedures necessary for the operation of a conventional type of projector.

Various attempts which have been made to simplify the threading of the film into the projector, as by self-threading apparatus or by the use of cartridges, have not achieved wide spread popularity and often involve the use of fairly expensive and cumbersome apparatus. Even these projectors which make an attempt to avoid the problems incident to threading often require a fair degree of skill and time for proper operation and to avoid mutilation or destruction of the film.

There exists a need for a motion picture projector of the type which is cartridge loaded, which is self-sufficient in terms of incorporating its own screen assembly, is suitable for rapid change over to facilitate the presentation of different subject matter or the substantially uninterrupted projection of continuous material, is relatively compact and suitable for portable use and is relatively inexpensive.

Broadly, it is an object of the present invention to provide a motion picture projector which realizes one or more of the aforesaid objectives. Specifically, it is within the contemplation of the present invention to provide a motion picture projector, which may be of the silent or sound type, wherein the film is contained within a removable cartridge and the projector mechanisms including a foldable rear screen assembly may be contained within a portable carrying case, or optionally, may be mounted in a fixed assembly which includes such rear screen assembly.

In accordance with an illustrative embodiment demonstrating objects and features of the present invention, the present motion picture film projector incorporates a cartridge having a turntable rotatably mounted therein which supports an endless coil of film having a closed loop emanating from the inner convolution of the coil and returning to the outer convolution thereof. Film transport and guide means are arranged within the cartridge to unwind the film at the inner convolution, pass the film along a prescribed course and return the film to the outer convolution. A film gate is arranged along the course and defines a film guide extending in a plane substantially at right angle to the axis of the turntable and through which the film passes. Provision is made for distending the film to a location outwardly of the cartridge to a sound pickup location wherein sound-reproducing means are arranged and incorporated in the projector mechanism for playback of the audio information contained on the film. Upon insertion of the cartridge into the motion picture projector, the required mechanisms are brought into operative relation to the cartridge and the required optics are oriented relative to the film gate to enable the frame by frame projection of the film and the concurrent playback of the sound.

As a feature of the invention, loop-forming means are included within the cartridge in leading and trailing relation to the film gate for establishing free loops of film before and after the film gate preliminary to the engagement of the projector mechanisms. After the insertion of the cartridge and engagement of the projector mechanisms, the loop-forming means are retracted from the film feed path to enable the unimpeded frame by frame passage of the film through the film gate. As a still further feature of the invention, incident to the insertion of the cartridge into the projector, provision is made for adjusting the film gate and the film, both vertically and laterally, relative to the projector optics and the film claw to assure the proper projection of a well-defined optical image.

In accordance with further aspects of the invention, the projector is constructed in a manner to assure positive and reliable operation with controls representing the utmost in simplicity from the standpoint of operator's skill and dexterity. The motion picture projector has a run mode and a stop mode and is provided with a cartridge-receiving chamber adapted to receive the film-containing cartridge. Driving mechanisms including a transport drive external to the chamber are provided which are shiftable into driving engagement with the film transport means within the cartridge. Likewise, a film claw to impart intermittent motion to the film as it passes through the film gate is arranged externally to the cartridge-receiving chamber and is shiftable into an operative position relative to the film gate. A control is provided which may be operated after the cartridge is disposed in the cartridge-receiving chamber for shifting the transport drive into engagement with the film-transport means within the cartridge and for shifting the film claw into its operative position relative to the film gate. Still other aspects of the projector mechanisms which render the same suitable for the purposes intended herein will be described in conjunction with the detailed description of the invention which follows.

As a still further feature of the invention, the projector includes a collapsible screen assembly which is adapted to be housed within a carrying case which, for all practical purposes, has the external appearance of a brief case or an attache case and is of comparable size. In accordance with this aspect of the invention, the projector mechanisms are mounted within the base of a carrying case having a hinged cover, with image-projecting optics within the base providing an upwardly directed light beam extending through the top wall thereof. The collapsible screen assembly is normally housed within the cover of the carrying case when the cover is in its closed position and is extensible into an erected position when the cover is swung to the open position. The collapsible screen assembly includes a translucent screen which is brought into position for the rear illumination thereof, with the necessary mirror being interposed between the image-projecting optics contained within the base and the translucent screen such that an image can be projected on the screen. Advantageously, the screen is constructed in a manner wherein it may be completely collapsed into a compact assembly suitable for storage within the depth of the cover without materially increasing the overall height or width of the case and is readily erectable with but the simpliest series of manipulative steps which may be practiced by a relatively unskilled person.

Still other features and advantages of the present portable and cartridge loaded projector which render the same highly suitable for many and diverse applications including sales presentations, audio-visual education, entertainment and the like will become apparent as the detailed description proceeds.

The above brief description, as well as further objects and features of the present invention will be more fully appreciated by reference to the following detailed description of a presently preferred, but nonetheless illustrative embodiment in accordance with the present invention, when taken in conjunction with the accompanying drawings, wherein.

Figure 15:
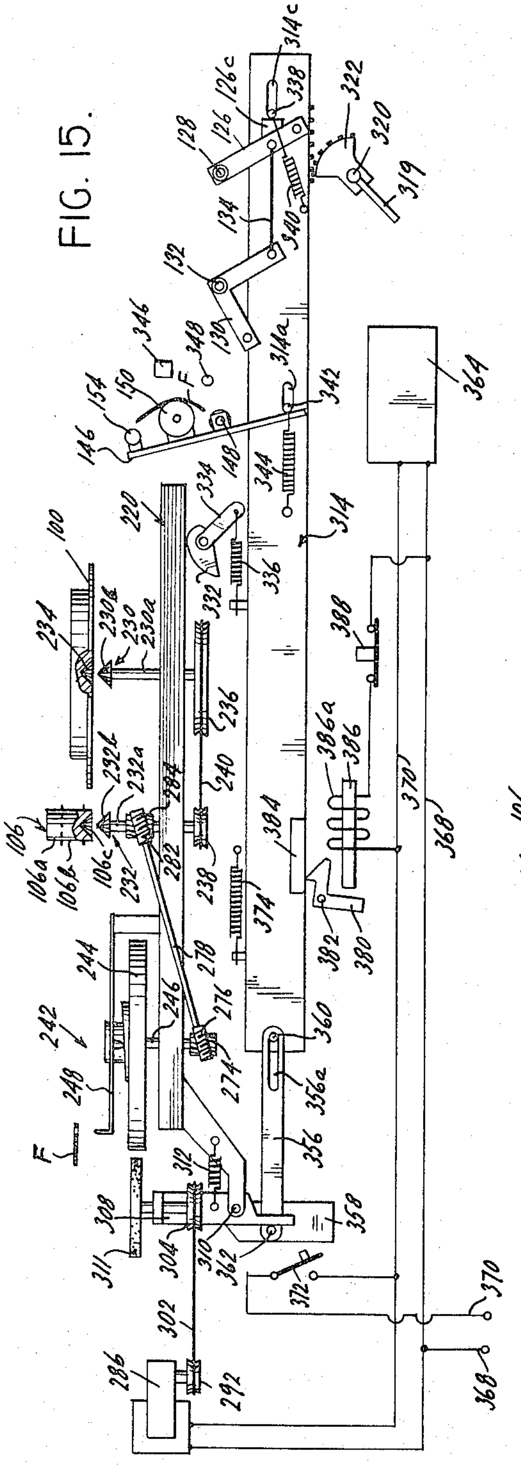
Figure 16:
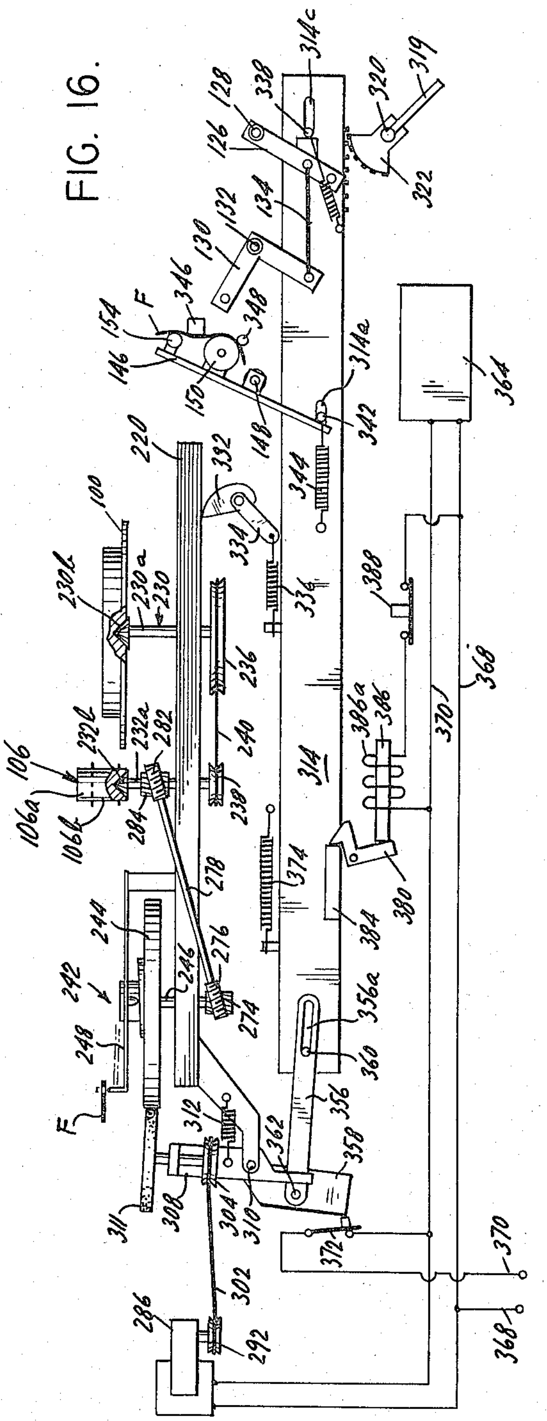

FIG. 15 is a schematic and diagrammatic view of the basic components incorporated into the projector and its control illustrated in the stop mode prior to the shifting of the control member and the carrier to their respective run mode positions; and FIG. 16 is a schematic and diagrammatic view similar to FIG. 15 but showing the projector in the run mode, with the control member and the carrier in their respective run mode positions.

Referring now specifically to the drawings, there is shown a motion picture projector embodying features of the present invention and generally designated by the reference numeral 20 which includes a carrying case 22 having a base 24 and a cover 26. The base 24 receives the film-containing cartridge and the projector mechanisms which will hereinafter be described in detail, while the cover 26 houses a collapsible screen assembly, generally designated by the reference numeral 28. In the interest of an orderly exposition of the present invention, specific reference will be made to FIGS. 1 to 4 and 7 for a description of the carrying case 22 and the collapsible screen assembly 28 preliminary to a description of the projector mechanisms and the film-containing cartridge.

Figures 1, 2, 4:
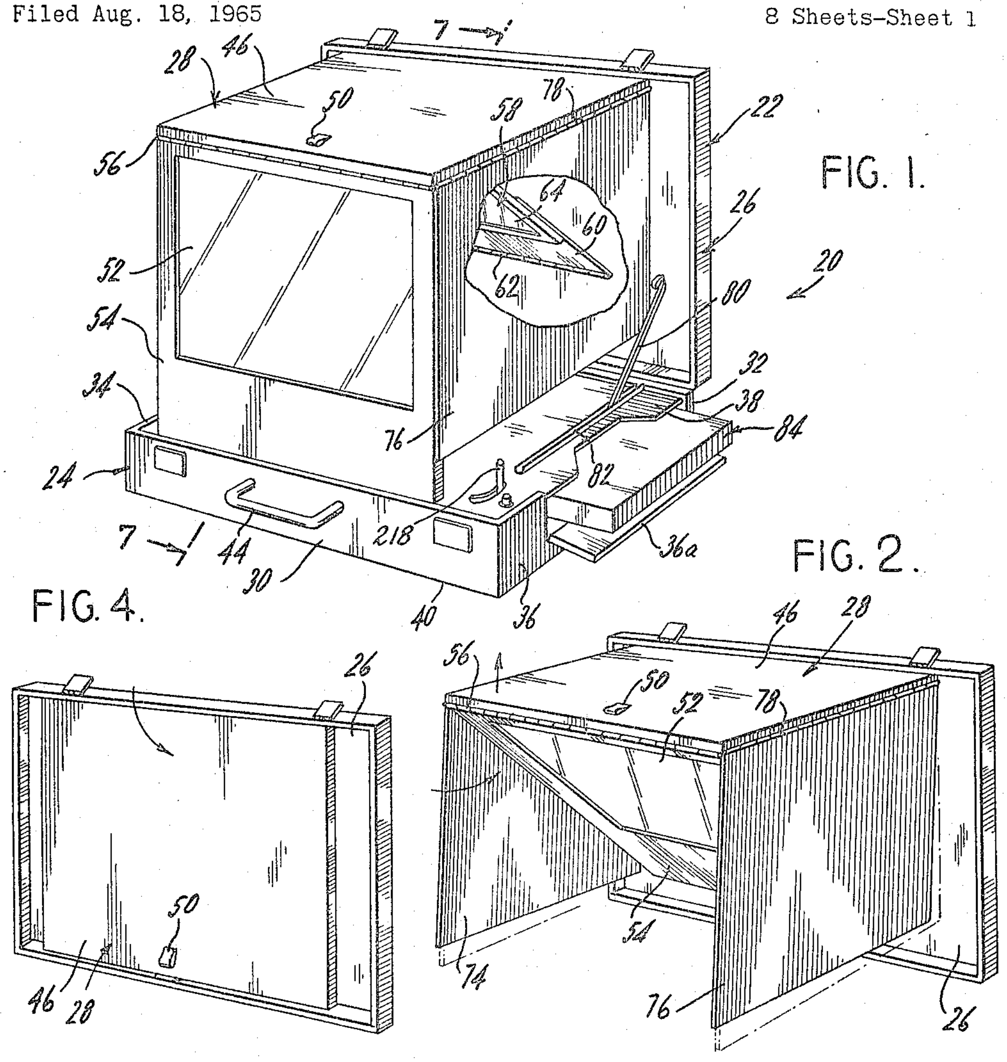
FIG. 1 is a perspective view of a portable projector demonstrating features of the present invention, shown with the collapsible screen assembly in the erected position, with part of one of the light shields broken away to expose the internal construction and with the film cartridge partially inserted into the base of the carrying case of the projector.
FIG. 2 is a perspective view similar to FIG. 1, but with the base removed and showing the translucent screen partially folded back incident to collapsing the screen assembly.
FIG. 4 is a perspective view showing the cover for the case, with the collapsible screen housed therein in position such that the cover may be moved into the closed position overlying the base of the carrying case.
Figure 7:
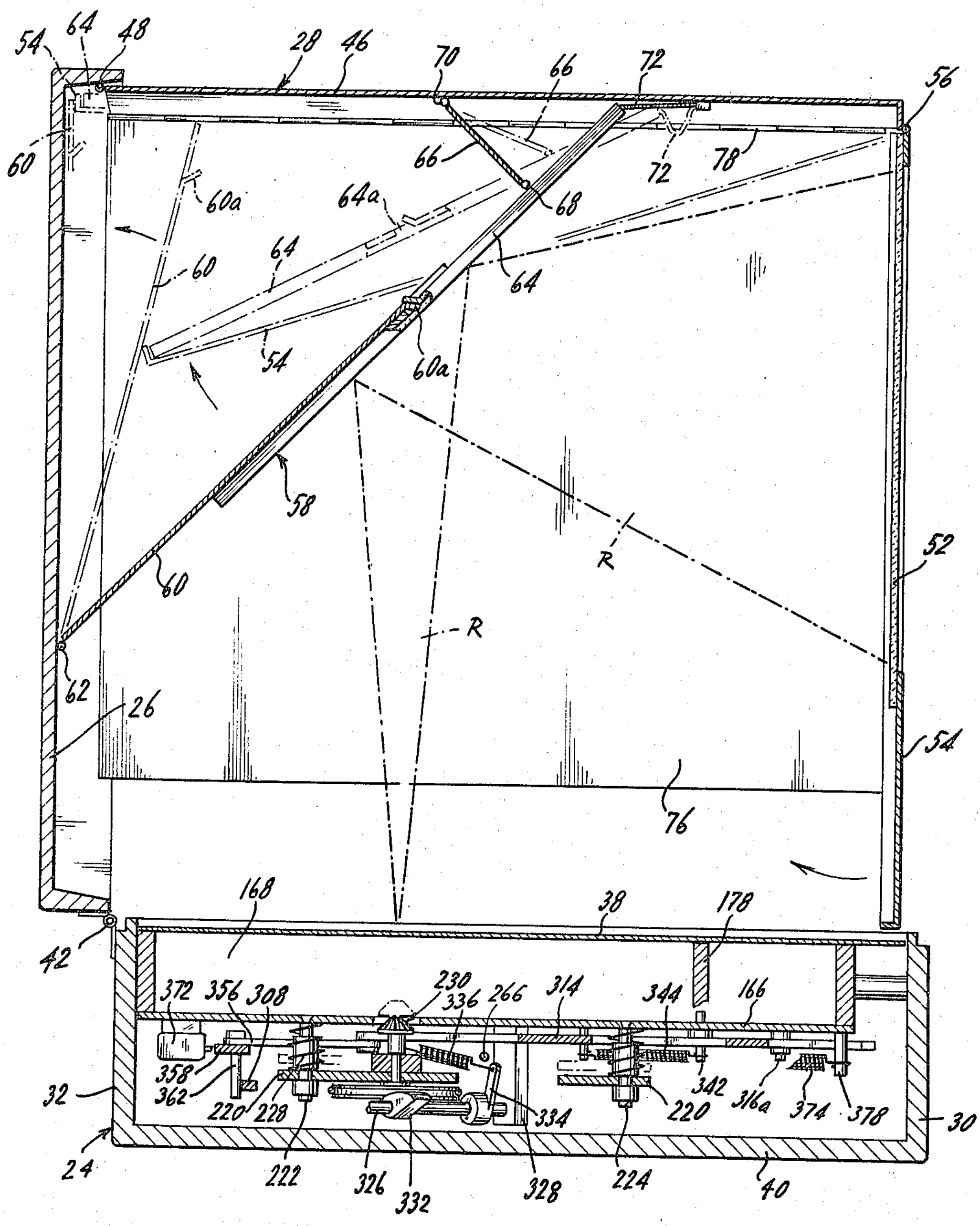
FIG. 7 is a vertical sectional view of the motion picture projector, with the case opened and the screen erected, taken substantially along the lines 7—7 in FIG. 1 and looking in the direction of the arrows.

Referring first to FIG. 1, the base 24 of the carrying case 22 is seen to include front and rear walls 30, 32, opposite side walls 34, 36 and top and bottom walls 38, 40. The cover 26 is hingedly connected to the base along the upper edge of the rear wall 32 by hinges 42 for movement about a cover pivot between a closed position overlying the top wall 38 of the base 24 and an open position extending substantially at right angles to the top wall 38, as indicated in FIG. 1. As will be detailed hereinafter, projector mechanisms are mounted within the base 24 and include image-projecting optics projecting an upwardly directed light beam extending through and substantially at right angles to the top wall 38, as generally indicated in FIG. 7 by the diverging light rays R. The front edge of the hinged cover 26 and the front wall 30 of the base 24 are provided with locks of the type usually employed on an attache case and the front wall 30 carries a handle 44.

The collapsible screen assembly 28 is normally housed within the cover 26 when the latter is in a closed position overlying the base 36, with the collapsed or stored position of the screen assembly 28 being shown in FIG. 4. The screen assembly 28 is extensible into the erected position illustrated in FIG. 1, with the cover 26 in the opened position, by the progressive erection steps illustrated in FIGS. 4 to 1 inclusive; and conversely, the screen assembly 28 may be collapsed into the stored or housed position illustrated in FIG. 4 by going through the manipulative steps shown progressively in FIGS. 1 to 4 inclusive. The collapsible screen assembly includes a carrier member 46 hingedly connected to the cover 26 by hinges 48 (see FIG. 7) for movement about a carrier pivot spaced from and parallel to the cover pivot afforded by the hinges 42. The carrier member 46 is adapted to be swung between the erected position substantially parallel to the top wall 38 of the base and at right angles to the cover 26 (see FIGS. 1 and 7) and a collapsed position lying within the outline of the cover 26 and parallel thereto (see FIG. 4). For convenience, a lift tab 50 is secured to the carrier member 46 contiguous to the front edge thereof. A translucent screen 52 mounted within a frame 54 is hingedly connected to the carrier member 46 by a piano-type hinge 56 for movement about a screen pivot spaced from and parallel to the carrier pivot afforded by the hinge or hinges 48. The screen and frame 52, 54 are movable from a depending position extending vertically and freely, as illustrated in FIGS. 1 and 7, to a stored or collapsed position underlying the carier member 46.

A reflecting subassembly, generally designated by the reference numeral 58, is mounted on the cover 26 and the carrier member 46 and serves as a collapsible cross-brace extending at an angle of approximately 45° to the erected cover 26 and carrier member 46, as seen in FIGS. 1 and 7. The reflecting subassembly includes a supporting arm 60 which is connected by hinge 62 to the cover 26 for movement about an arm pivot intermediate and parallel to the cover and carrier pivots 42, 48 and a framed reflecting mirror 64 which is hingedly connected to the carrier member 46 intermediate and parallel to the carrier and screen pivots 48, 56. The framed mirror 64 is hingedly connected to the carrier member 46 by a suspending link 66 having a pivotal connection 68 at the back of the mirror 64 contiguous to the upper end thereof and the pivotal connection 70 to the carrier member 46. Additionally, a flexible band or strap 72 is attached to the upper end of the mirror 64 and the underside of the carrier member 46 to impart stability to the brace and to limit the pivotal movement of suspending link 66. Interengaging locking means are provided on the supporting arm 60 and the reflecting mirror 64 for releasably securing the components of the reflecting subassembly 58 at an acute angle to the incident light beam when the cover 26 is in the opened position and the carrier member 46 is in the erected position such that the mirror 64 will center the reflected beam through the erected translucent screen 52, as seen best in FIG. 7. The optical system is designed so that the screen 52 is substantially filled by the projected image. The interengaging locking means include a locking finger 60*a* on the supporting arm which is bent at an angle thereto and is received within an appropriate slot or cut-out 64*a* in the back side of the framed mirror 64. When the finger 60*a* is engaged within the slot 64*a*, the supporting arm 60 and mirror 64 become a rigid angled brace maintaining the cover 26 and the carrier member 46 in the requisite relation to each other. When disengaged, by lifting carrier member 46 and raising the screen frame 54 toward its stored position, the supporting arm 60 is automatically swung about the arm pivot 62 to its stored position lying against the inside of the cover 26 (as shown by the progressive dotted lines in FIG. 7), and the mirror 64 is at the same time swung to its stored position lying against the underside of the carrier member 46, as likewise shown by the progressive dotted line showings in FIG. 7.

Figure 3:
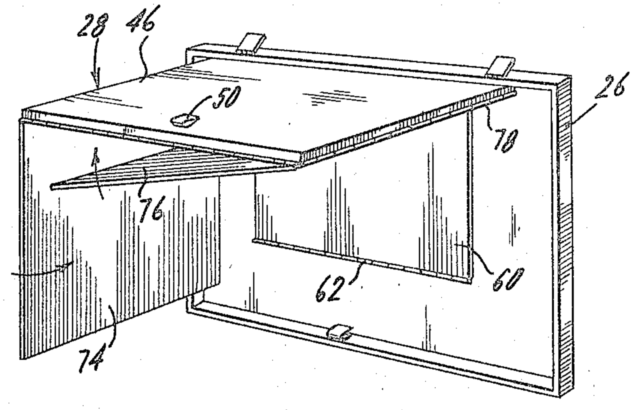
FIG. 3 is a perspective view similar to FIG. 2, with the translucent screen in its stored position and with one of the side light shields partially folded to its stored position.

As seen best in FIGS. 1 to 3 inclusive, respective light shields 74, 76 are hingedly connected to the opposite sides of the carrier member 46 by piano-type hinges 78 or the like such that the shields may be pivoted about respective shield pivots extending at right angles to the carrier and screen pivots 48, 56. The light shields 74, 76 are normally housed within the cover 26 overlying each other and underlying the translucent screen 52, 54, as may be best aprpeciated by progressively inspecting FIGS. 2 and 3. In the erected position of the screen assembly 28, the light shields depend from the carrier member 46 to cooperate with the cover 26 and the carrier member 46 and the top wall 38 to define a light enclosure for the incident and reflected beams to afford improved image contrast for the picture projected by this portable and collapsible device.

Provision is made for releasably securing the cover 26 in the open position extending substantially at right angles to the base 24 of the carrying case 22. In this illustrative embodiment, two hinged braces 80 are pivotally attached on each edge of the inside of the cover 26 and are releasably engaged along respective tracks 82 on the top wall 38 to hold the cover in the open position.

In order to appreciate the manner in which the screen assembly 28 may be collapsed, a typical sequence of closing will be described, with progressive reference being made to FIGS. 1 to 4 inclusive and the several dotted line showings in FIG. 7. The operator grasps the tab 50 to lift the carrier member 46 slightly upwardly, as indicated by the directional arrow in FIG. 2, which disengages the interengaging locking elements 60*a*, 64*a*. Thereupon, the screen 52, 54 may be swung rearwardly about the screen pivot 56, as indicated in FIG. 2 by the directional arrow. As the screen 52, 54 swings rearwardly it engages the lower end of the mirror 64 and the supporting arm 60, swinging the latter to its stored position lying against the cover 26 and the former to its stored position against the carrier member 46, as indicated by the progressive dotted line showings in FIG. 7. Finally, the light shields 74, 76 may be swung inwardly to overlie each other and underlie the screen 52, 54 whereupon the folded subassembly may be swung about the carrier pivot 48 into the housed or stored position illustrated in FIG. 4.

An advantage of the projector 20 resides in the ability to employ the same for front projection. This is accomplished by folding the collapsible screen assembly 28 into its housed position within the cover 26 and standing the projector, with the aid of any appropriate adjustable legs or props, on the rear wall 32 such that the lens assembly will project the image toward a remote screen. As is essential the projected image will be oriented both right to lift and top to bottom since the optical path in the first instance experiences two reversals after leaving the projection lens assembly, a first by the mirror 64 and a second by the transluscent screen 52. Thus, the projector can serve for front projections, with but the removal of the collapsible screen from its erected position and without the addition of any optical attachments.

Beneath the top wall or panel 38 of the base 24 of the carrying case 22 there is housed the projector mechanisms which include drive member for film-advancing components, film claw and shutter optical elements, a magnetic sound pickup arrangement, an audio amplifier and various controls which are to operate in conjunction with the film-containing cartridge, which is generally designated by the reference numeral 84. The cartridge 84, which is shown in detail in FIGS. 8 to 10 inclusive, is inserted into the base 36 through the hinged side door 36*a*, as seen best in FIGS. 1 and 8. The cartridge 84 is received within a cartridge-receiving chamber formed beneath the top wall 38 of the case 22, as will be detailed hereinafter. Since the several functions and controls of the projector 20 are dependent upon an understanding of the cartridge 84, specific reference will now be made to FIGS. 8 to 10 inclusive for a detailed description of a typical cartridge embodying features of the present invention. In use, the cartridge 84 extends substantially in a horizontal plane while the film F contained therein is wound into a coiled configuration wherein the successive convolutions C lie substantially in a vertical plane. The optical projection path is along a vertical axis and the cartridge is arranged such that the successive inner convolutions $C^1$ which are fed into the endless loop L and about the cartridge are reoriented to pass horizontally through a film gate associated with the projection optics.

Thus, the projector 20 can be designed to be accommodated within the limited space available within a case of a convenient overall size for maximum compactness and portability. In actual practice, the casing may be designed to be as small as 15″ in length, 11″ in width and 4″ in depth. It is to be understood however that the present projector may be installed in other forms of housing which are not necessarily portable and which do not incorporate a collapsible screen assembly. One of the advantages of the present invention resides in a novel cartridge construction which makes it possible to operate the instant projector by loading successive cartridges therein, followed by simple manipulations and adjustments to establish running conditions. For example, a full length motion picture can be presented by furnishing the operator with an appropriate number of cartridges which may be loaded in sequence into the projector, with an elapsed time of only a few seconds between the projection of the last frame of the preceding cartridge and the first frame of the next succeeding cartridge.

Since the film does not have to be rewound, the cartridge is ready to be rerun from the beginning of the film presentation upon completion of the preceding run.

Figure 10:
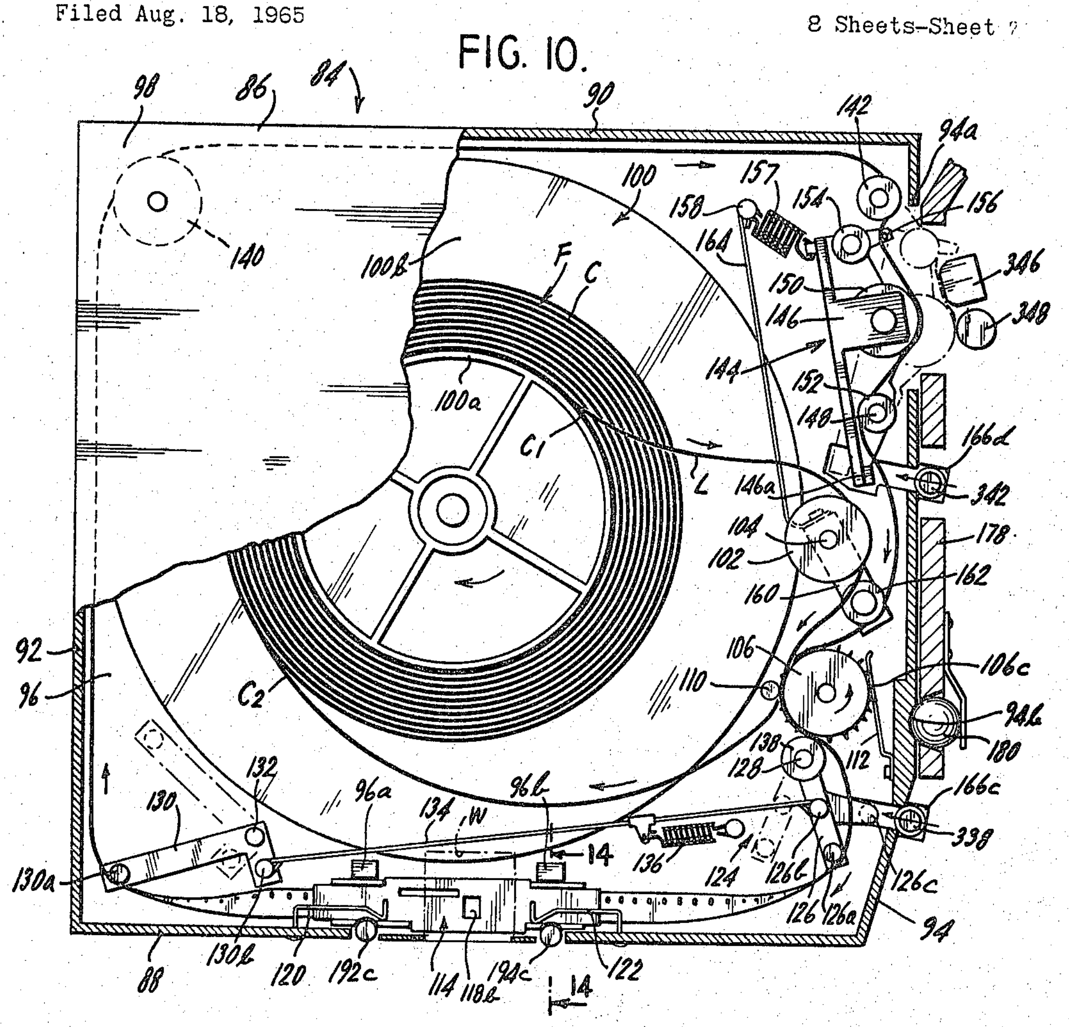
FIG. 10 is a plan view, with parts broken away and sectioned, of the cartridge to be employed in accordance with the present invention, with the cartridge being illustrated with the loop-positioning fingers in their operative position and with the film-distending carriage for the magnetic pickup head illustrated in the retracted position.

As seen best in FIG. 10, the cartridge 84 includes a cartridge casing or housing 86 having front and rear walls 88, 90, opposite side walls 92, 94, a bottom wall 96 and a top wall 98 defining a substantially rectangular enclosure for the film F. Rotatably mounted within this enclosure is a horizontal turntable 100 which is rotatably mounted on the bottom wall 96 of the cartridge casing 86 for turning movement about a vertical turntable axis. The turntable 100 includes an upstanding central hub **100*a* and a radially projecting annular platform 100*b*. The film F includes an endless coil of multiple convolutions C wound about the hub 100*a* and having a closed or endless loop L which emanates from the inner convolution $C^1$, and after passing along a prescribed course about the cartridge casing 86, is returned to the outer convolution $C^2$. As the film F is fed from the innermost convolution $C^1$, it passes about an idler and guide roller 102 which is journalled at the pivot 104 on the bottom wall 96. The film F then is guided to a film-transport means which is adapted to engage the film F at its sprocket holes thereby unwinding the same at the inner convolution $C^1$, pass the film along the prescribed course about the perimeter of the casing 86 and return the film at the outer convolution $C^2$. In this illustrative embodiment, the film transport means is in the form of a double-decked sprocket 106 which is journalled for rotation on end bearings. The upper end bearing (not shown) is in the form of a semi-spherical projection on an overhanging leaf spring 182 (FIG. 6) which serves to orient the sprocket for engagement to its drive. The sprocket 106 includes an upper deck 106*a* and a lower deck 106*b*. (See FIGS. 15 and 16). The upper deck 106*a* is oriented at a level above the coil to receive the endless loop L substantially in the orientation in which it passes over the coil C and while in a vertical attitude. The lower deck 106*b* is at a level to receive the endless loop L after it has passed about the perimeter of the casing and through the several cartridge mechanisms, with the film F being at a level such that it will pass directly to the outer convolution $C^2$ of the coil. Each deck 106*a*, 106*b* has teeth 106*c*, adapted to engage in the sprocket holes of the film for the feeding and return of the film to the coil C while keeping loop L at a constant length. A guide post 110 is arranged to one side of the film-transport sprocket 106 to aid in establishing a guided path for the film F as it passes about the upper and lower decks 106*a*, 106*b* of the sprocket 106. A spring finger 112 cooperates with the guide post 110 to ensure that the film F will not become disengaged from the sprocket 106 when the cartridge 84** is removed from the projector.

Figures 11, 12:
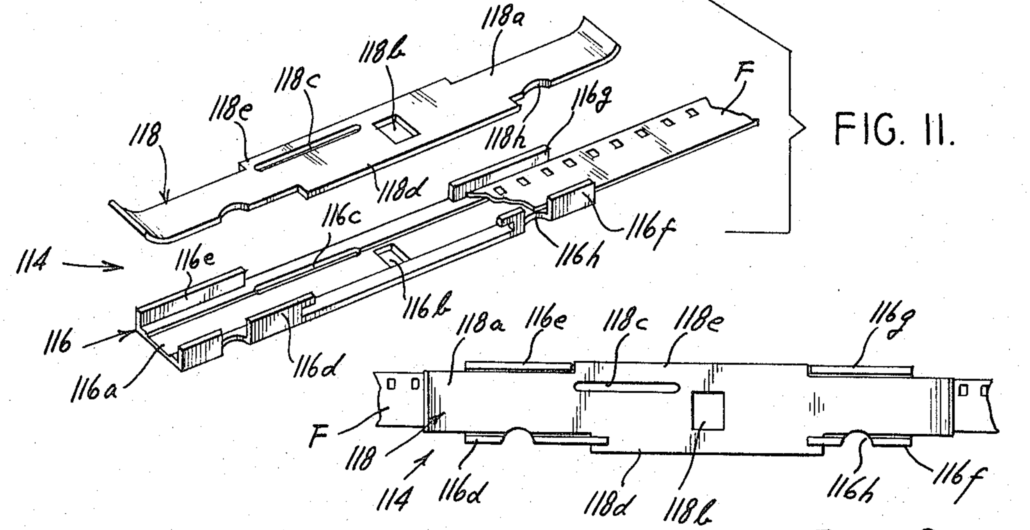
FIG. 11 is an exploded perspective view of the film gate employed in the removable cartridge, with a short length of the film illustrated in its position for passage through the guideway defined by the film gate.
FIG. 12 is a plan view of the film gate.

Disposed along the front wall 88 of the cartridge casing 86 and extending in a substantially horizontal orientation is a film gate 114 which is adapted to receive the film F as it passes along its prescribed course within the cartridge. The film gate, the details of which are seen best in FIGS. 11 and 12, is seen to include a gate body 116 and a hold-down plate 118 which cooperate to define a film guideway extending horizontally and along the front wall 88 parallel to the bottom wall 96 of the cartridge 84. The gate body 116 includes a base plate **116*a* which is relieved medially along its top face and is provided with a framing aperture 116*b* and an elongated claw slot 116*c*. The hold-down plate 118 includes an elongated body 118*a* relieved along its under face and having its leading and trailing ends turned upwardly to provide unobstructed entry and exit ends for the film guideway. The body 118*a* is provided with a framing aperture 118*b* which is adapted to be coextensive with the framing aperture 116*b* when the gate body 116 and holddown plate 118 are assembled with each other. Similarly, the body 118*a* is provided with an elongated claw aperture 118*b* which registers with the claw aperture 116*b***.

The gate body 116 and hold-down plate 118 are interengaged with each other by the provision of upstanding flanges **116*d*, 116*e*, 116*f* and 116*g* on the gate body 116 which are formed to receive side projections 118*d*, 118*e* formed on the hold-down plate 118. The flanges 116*d*, 116*f* are spaced and undercut to accommodate the projection 118*d* (see FIG. 12) while the flanges 116*e*, 116*g* are spaced to accommodate the projection 118*e*. As is generally understood, the projection lens assembly is arranged to project a light beam substantially vertically through the aligned framing apertures 116*b*, 118*b*, while the film claw of the film-transport mechanism is adapted to engage the film F through the aligned slots 116*c*, 118*c* for the intermittent frame by frame advance of the film through the gate. Provision is made in the cartridge and projector for adjusting the film gate 114 relative to the projection lens assembly and the film claw position in response to insertion of the cartridge 84 into the projector 20**, as will be detailed hereinafter.

The film gate 114 is floatably mounted in the cartridge for vertical and lateral adjustment by the provision of upstanding stops **96*a*, 96*b* on the bottom wall 96 of the cartridge casing 86 which stops are in alignment with each other and are in spaced parallel relation to the front wall 88 of the cartridge casing 86. A pair of springs 120, 122 overlie the hold-down plate 118 of the film gate 114 and serve to bias the film gate downwardly and forwardly against the adjusting means which will vertically and laterally orient the film gate and film upon insertion of the cartridge 84 into the projector 20**.

Disposed in leading and trailing relation to the film gate 114 is a loop-forming and adjusting assembly, generally designated by the reference numeral 124, which is arranged to adjust the closed loop L in relation to the film gate 114 to assure that there will be sufficient film in the form of free loops both before and after the film gate 114 for the proper functioning of the projector mechanisms associated therewith. Specifically, the loop-forming assembly 124 includes a first loop-adjusting finger 126 disposed in leading relation to the film gate 114 and having a finger pivot 128 on wall 96 and a second loop-adjusting finger 130 disposed in trailing relation to the film gate and having a finger pivot 132 on wall 96. The pivots 128, 132 for the loop fingers 126, 130 extend in spaced parallel relation to each other and to the turntable axis. The loop-adjusting finger 126 includes an upstanding guide pin or roller **126*a* about which the film F passes prior to entry into the film gate. Similarly, the loop-adjusting finger 130 includes an upstanding guide pin or roller 130*a* about which the film passes after leaving the film gate. The 90° twist is imparted to the film after leaving the guide pin 126*a* and prior to entering the gate 114 and vertical orientation is re-established after the film leaves the film gate 114 and as it passes about the guide pin 130***a*. The fingers 126, 130 are coupled for movement in unison by a connecting link 134 which extends therebetween and is connected to respective pins 126*b*, 130*b* on the fingers. A spring 136 is operatively connected to the connecting link 134 and anchored on the bottom wall 96 of the cartridge casing 86 and serves to normally bias the fingers 126, 130 into the operative position illustrated by the full lines in FIG. 10. Provision is made by means external to the cartridge 84 which engage actuator 126*c* on finger 126 and which are operable automatically during the establishment of the run mode of the projector to pivot the fingers 126, 130 to the retracted or inoperative position shown by the dot-dash lines in FIG. 10. As a matter of convenience, the pivot 128 for the finger 126 is arranged relative to the double-decked sprocket 106 such that the pivot 128 carries a guide roller 138 which aids in establishing the wrap of the film about the sprocket 106.

After the film F leaves the trailing finger 130, it passes along a path parallel to the side wall 92 of the cartridge, about an idler roller 140, along a path parallel to the rear wall 90 and about an idler roller 142. Thereupon, the film passes through a film-distending assembly 144 which is arranged to bring the film F into an operative position relative to a magnetic pickup head 346 and capstan 348, both of which are external to the cartridge 84 and are arranged to cooperate with the film-distending assembly 144 to achieve playback of a magnetic sound track or stripe on the film F. The film-distending assembly 144 which is arranged generally along the side wall 94 of the cartridge casing 86 is seen to include a film-distending carriage 146 which rocks about a carriage pivot 148 between the full line retracted position illustrated in FIG. 10 and fully within the cartridge and the dotted line operative position extending partially through the opening or cutout 94*a* in the side wall 94 of the cartridge casing 86. The carriage 146 includes a medially disposed rubber-faced capstan-contacting roller 150 and guide or idler rollers 152, 154 disposed on opposite sides thereof. Spaced from the guide roller 154 is a guide pin 156. In the retracted or inoperative position of the carriage 146, the film passes between the guide roller 154 and the guide pin 156, is partially wrapped about the capstan-engaging roller 150 and passes behind the guide roller 152. Thence, the film passes through a damping assembly to the underdeck 106*b* of the sprocket 106 whereupon the film is restored to the outer convolution $C^2$ of the coil C. The film-distending carriage 146 is normally biased into its retracted or inoperative position by spring 157 which is anchored at pin 158 and is operatively connected to the carriage 146 at a point remote from the carriage pivot 148. As will be described, provision is made for pivoting the carriage 146 to the operative position shown by the dot-dash lines in FIG. 10 by means which enter the cartridge 84 as the projector mechanisms are moved from the stop mode to the run mode.

The damping assembly includes a damping arm 160 which is mounted on roller pivot 104 and carries a damping idler 162 which is positioned along the film after its egress from the film-distending assembly 144 and prior to reaching the sprocket 106. A spring wire 164 is operatively connected to the damping arm 160 and is mounted at pin 158.

As will be subsequently described, the purpose of the damping assembly is to coact with the flywheel to isolate perturbations of the film due to the intermittent action of the sprocket 106 from the magnetic pickup head 346 of the sound system.

As will be detailed, when the cartridge 84 is inserted into the projector mechanisms, the film gate 114 and film F are adjusted both vertically and laterally and the upper end bearing engages the sprocket 106 in axial alignment with the drive 232. Upon actuation of the projector control, the loop-forming fingers 126, 130 are retracted from the operative film path and the film-distending carriage 146 is moved to the operative position to bring the film into position for playback of the audio information recorded on the magnetic sound track thereof. Additionally, drive is imparted to the turntable 100 for the film F and to the film-transport sprocket 106 for constantly paying out film from the innermost convolution $C^1$, returning film to the outermost convolution $C^2$ and establishing a continuously replenished loop L of fixed size for the frame by frame projection of the visual information on the film F and the coordinated playback of the audio information recorded on the magnetic sound track.

Reference will now be made to FIGS. 5 to 15 inclusive for a detailed description of the projection mechanisms and related controls which coact with the film-containing cartridge 84. First, and in a general way, it will be seen that the base 24 of the carrying case 22 has a chassis plate 166 which is disposed in spaced parallel relation to the top and bottom walls 38, 40 of the base 24. The chassis plate 166 carries a number of upstanding and depending partitions which subdivide the interior of the base 24 into a number of compartments or chambers which receive the several components of the projector mechanisms. Specifically, and as seen best in FIG. 8, the chassis plate 166 and top wall 38 cooperate with each other to define the cartridge-receiving chamber 168 which has an open mounth 168*a* for receiving the cartridge 84 upon insertion thereof through the opening afforded by the hinged door 36*a* in the side wall 36 of the carrying case (see FIG. 1). As seen best in FIG. 6, provision is made at the margins of the cartridge-receiving member 168 to hold the cartridge 84 in an adjusted and operative position for projection of the motion pictures and playback of the sound. Specifically, at the margins of the cartridge (shown by the dot-dash lines in FIG. 6), there are provided hold-down clips 170, 172 and 174, with the clips 170, 172 being arranged at the front corners of the cartridge casing 86 and the clip 174 being arranged at one of the rear corners thereof. At the other rear corner, a guide rail 176 extends at an angle from the door opening 36*a* toward the clip 174 to guide the cartridge 84 during insertion into the cartridge-receiving chamber 168. Along the side of the cartridge-receiving chamber between the hold-down clips 172, 174, there is provided an abutment 178 which is intended to bear against the wall 94 of the cartridge casing 84. The abutment 178 is provided with a spring-biased ball 180 which is received within an alignment seat 94*b* (see FIGS. 8 and 10) in the wall 94 to accurately register the cartridge 84 within the chamber 168. The abutment 178 additionally carries a further hold-down clip 182 which is adapted to overlie the corresponding portion of the cartridge casing 86 to assist in the orientation of the same within the chamber 168.

Figure 8:
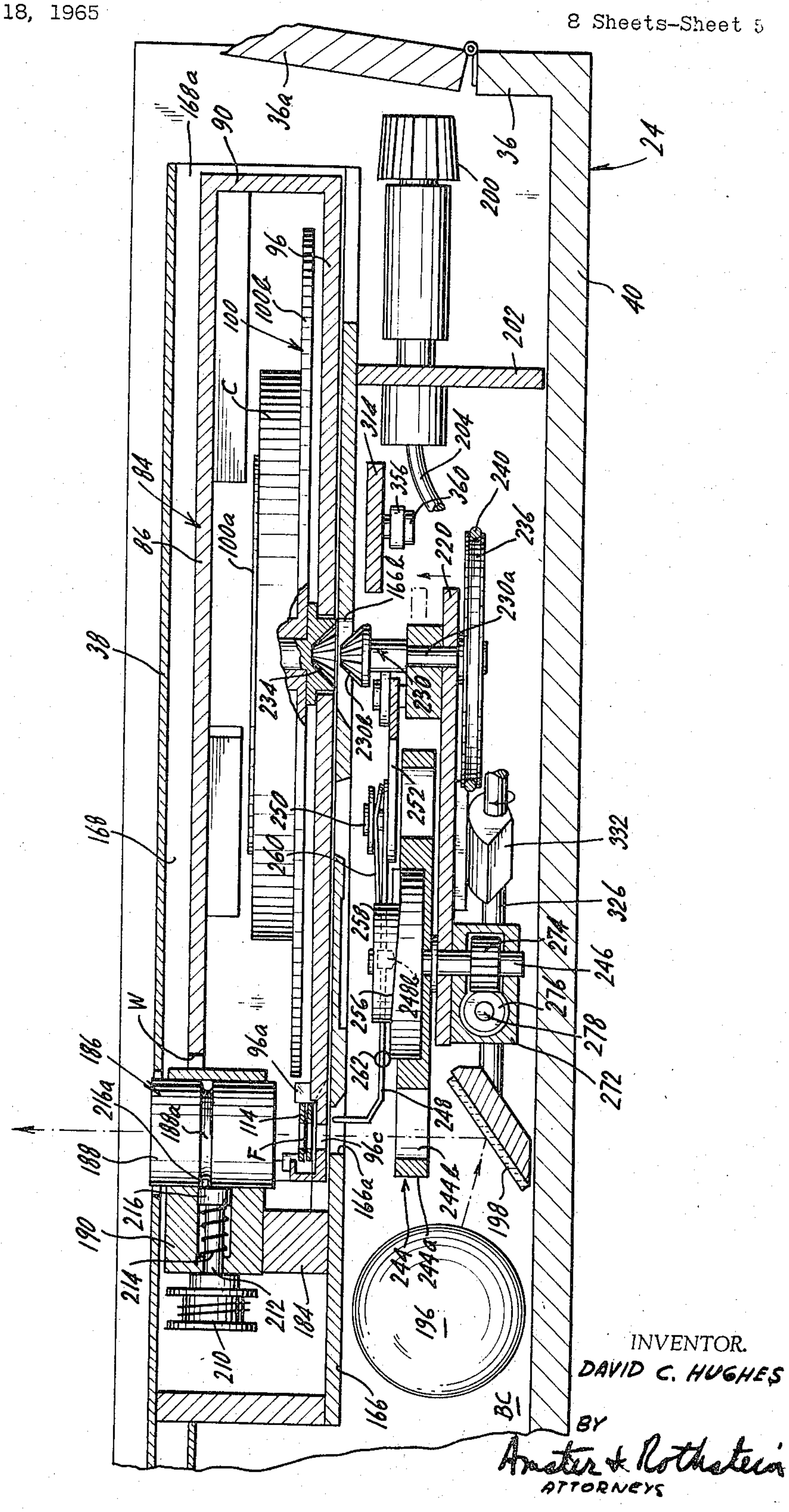
FIG. 8 is a fragmentary sectional view, on an enlarged scale and with parts broken away, taken substantially along the lines 8—8 in FIGS. 5 and 6, with the cartridge inserted in the cartridge-receiving chamber of the projector and the projector mechanisms in the stop mode.
Figure 9:
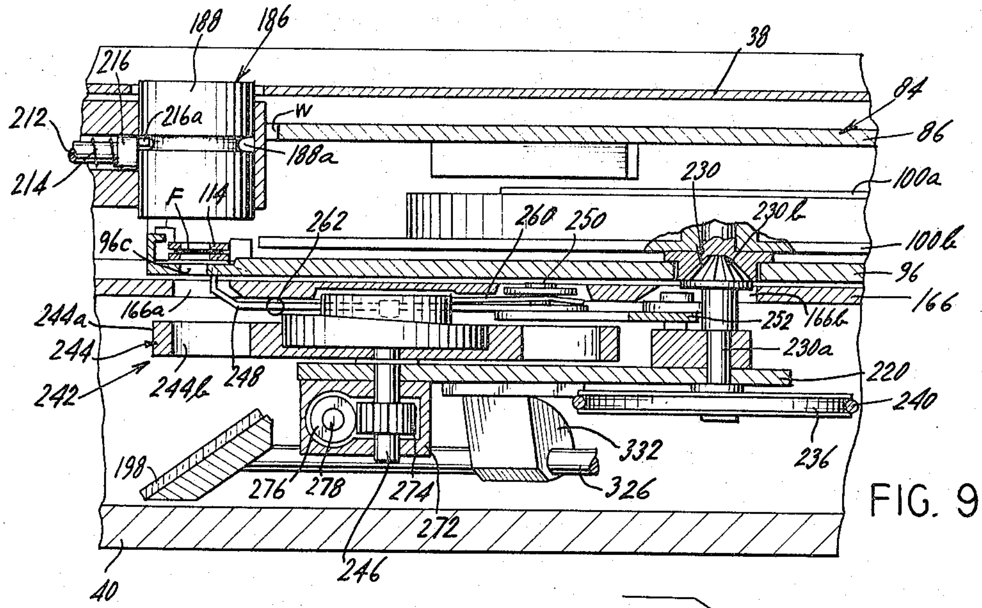
FIG. 9 is a fragmentary sectional view similar to FIG. 8, likewise showing the cartridge in the cartridge-receiving chamber of the projector, but with the projector mechanisms in the run mode.

Extending across the forward end of the cartridge-receiving chamber 168 is a mounting rail 184 which is secured to the chassis plate 166 and supports a cantilevered projection lens assembly 186. The projection lens assembly 186 includes a lens barrel 188 which is provided with an annular groove 188*a* about its periphery. The lens barrel 188 is mounted for vertical adjustment, as will be subsequently described, within a barrel block 190 secured to the rail 184. The barrel 188 includes the usual projection lens assembly which, when appropriately focused, will project an image from the film which is presented frame by frame at the film gate 114 onto the translucent screen 52. As seen in FIGS. 8 and 9, the casing 86 for the cartridge 84 is formed at its leading end and at a location extending inwardly from the front wall 88 thereof with a well or cutout W sized and positioned to accommodate the cantilevered projection lens assembly such that the optical axis thereof is appropriately aligned with the light source and of the film gate 114.

Figure 6:
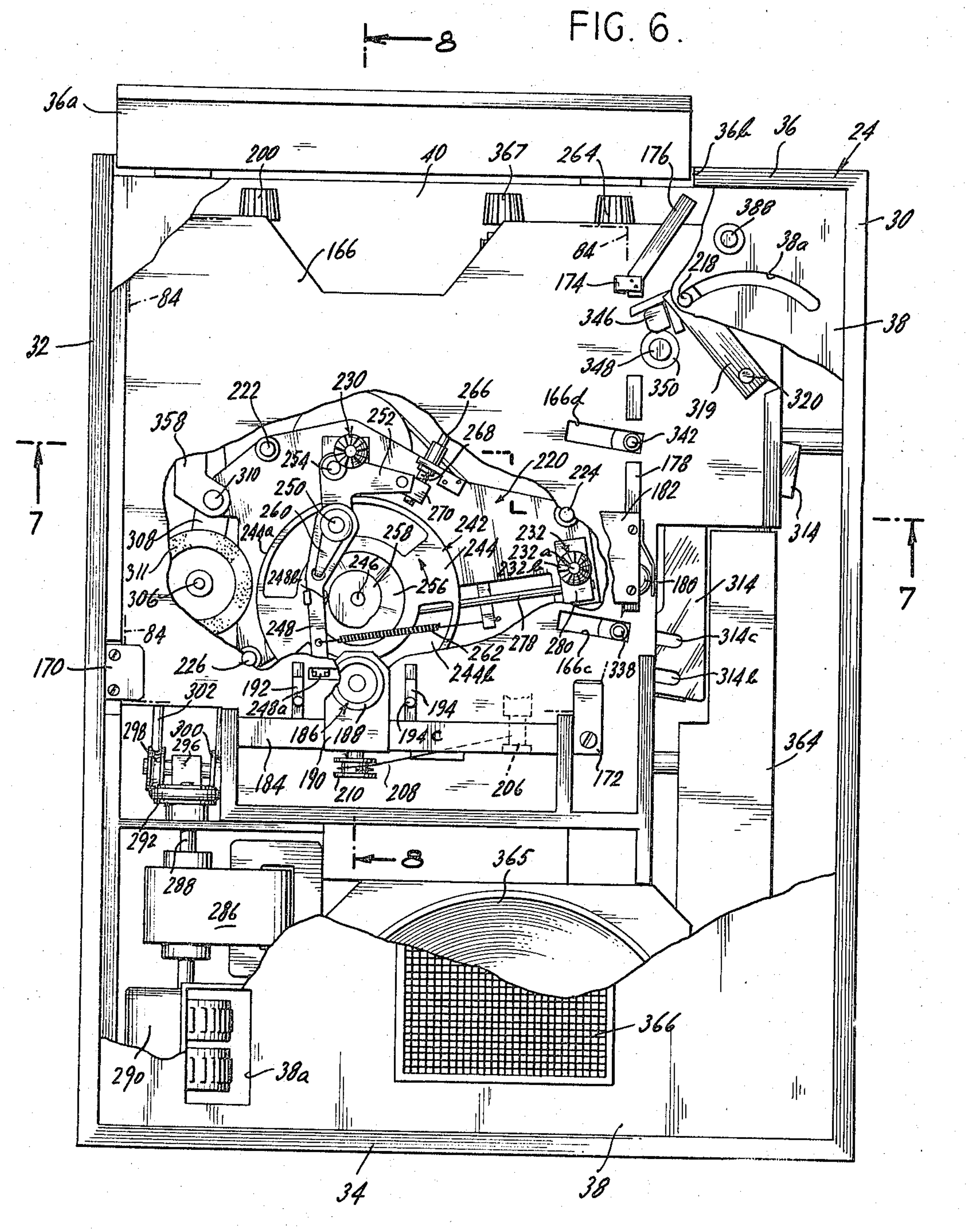
FIG. 6 is a top plan view, with parts broken away and sectioned, showing the mechanisms illustrated in FIG. 5 as viewed from above.
Figure 13:
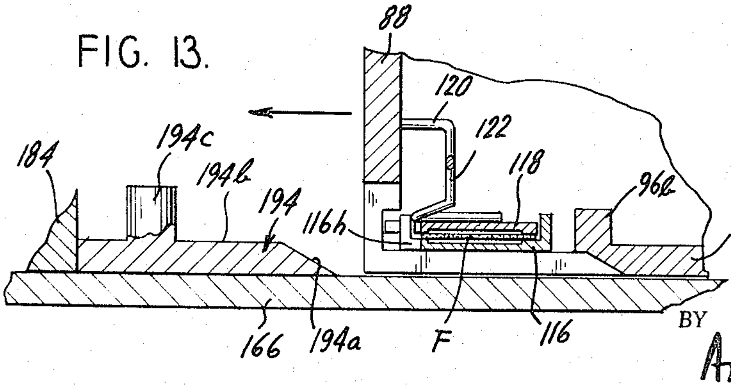
FIG. 13 is a fragmentary sectional view, on an enlarged scale, taken substantially along the line 14—14 of FIG. 10, illustrating the mechanisms for orienting the film gate relative to the optical assembly in response to insertion of the cartridge into the cartridge-receiving chamber of the projector.
Figure 14:
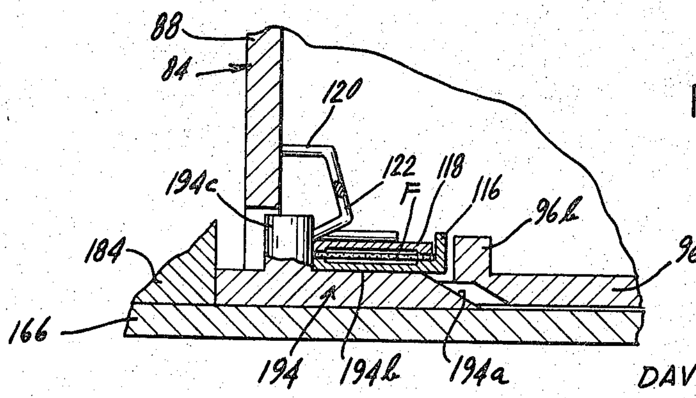
FIG. 14 is a fragmentary sectional view, likewise taken along the line 14—14 of FIG. 10 and showing the cartridge in its final operative position with the film gate adjusted relative to the optical assembly of the projector.

Referring specifically to FIGS. 11 to 14 inclusive, and as shown generally in FIG. 6, there are cooperating means on the projector and within the cartridge which adjust the film gate 114 relative to the optical assembly 186 in response to the insertion of the cartridge 84 into the cartridge-receiving chamber 168. Specifically, on the chassis plate 166 and at the opposite sides of the cantilevered projection lens assembly, there are provided substantially identical referencing members 192, 194. Since the sectional views of FIGS. 13 and 14 are taken through the referencing member 194, it will suffice to describe this one in detail. The referencing member 194 includes an inclined ramp 194a which merges into a horizontal face 194b having an upwardly projecting film-contacting pin 194c thereon. The adjacent portions of the bottom wall 96 and the front wall 88 of the cartridge casing 86 are cut away such that the referencing members may be received within the cartridge 84. Specifically, the ramp 194 engages the adjacent edge of the film gate 114, as may be appreciated by progressively inspecting FIGS. 13 and 14, to lift the same against the bias of the hold-down springs 120, 122 and to establish a precise vertical orientation for the film gate relative to the optics of the projector. As the cartridge 84 is inserted in its operative position, the pin 194c enters corresponding notches 116h, 118h in the gate body 116 and hold-down plate 118 of the film gate 114 such that the pin 194c optimally orients both the film gate and the film F laterally or horizontally relative to the optics and claw. Thus, a precise orientation is established for the film as it passes through the film gate for frame by frame projection. The reference members 192, 194 impart a three-dimensional orientation to the film gate 114.

Since the optics and the manner of adjusting the projection lens assembly 186 are substantially conventional, only a brief description is required. An appropriate projection bulb 196 is housed beneath the chassis plate 166 within a bulb compartment BC (FIG. 8) located approximately in the center of the base 24. Light from the bulb 196 is directed upwardly by mirror 198 through the shutter mechanism (to be subsequently described) and through registering cutouts 166a, 96a formed respectively in the chassis plate 166 and the bottom wall 96 of the cartridge casing 86. The incident light beam then passes through the laterally and vertically adjusted film gate 114 and film F, through the projection lens assembly 186 and to the reflecting mirror 64 (FIG. 7) whereupon the reflected beam is directed toward the translucent screen 52.

Provision is made by conventional means for vertically adjusting the projection lens assembly 186 to bring the projected image into focus on the screen 52. As seen best in FIGS. 5 and 8, a focus knob 200 is mounted on a control panel 202 secured beneath the chassis plate 166 at a location accessible to the door 36a. The control knob 200 is connected by a flexible cable 204 to a cable reel 206 which has a cable 208 wrapped thereabout and extending to a drum 210 journalled on the barrel block 190 (see FIG. 8). The drum 210 has a drum shaft 212 which supports a biasing coil spring 214 and carries an eccentric 216 having a pin 216a which is engaged within the annular groove 188a of the lens barrel 188. Turning of the focus knob 200 will, via the cable reel 206, the cable 208 and the drum 210, adjust the eccentric pin 216a against the influence of the biased spring 214 to vertically displace the barrel 188 and bring about a corresponding change in the focus of the projected image.

Reference will now be made to FIGS. 5 to 10 inclusive for a description of the projector actuating and control mechanisms which, in response to the manipulation of a single control handle 218 (see FIGS. 1 and 6), achieve a number of coordinated functions including engaging drive connections to the turntable 100 and the film-transport sprocket 106, activating the claw and shutter mechanism for the frame by frame presentation of the film, distending the film for playback of the sound track thereon and retracting the loop-forming fingers 126, 130. The actuating and control mechanisms include a shiftable carrier plate 220 which moves relatively to the cartridge receiving chamber 168 from a stop mode position (shown by the full lines in FIGS. 7 and 8) to a run mode position (shown by the full lines in FIG. 9). In this illustrative embodiment, the carrier 220 is suspended for vertical translatory movement on three mounting posts 222, 224 and 226 (see FIGS. 6 and 7). Appropriate springs, such as the spring 228 (see FIG. 7), are mounted on the respective posts between the chassis plate 166 and the carrier 220 to normally bias the carrier into the stop mode position of FIGS. 7 and 8. The carrier 220 is shiftable between the stop mode and run mode positions by the control handle 218.

Mounted on the carrier 220 is a film drive which is shiftable into driving relation to mechanisms in the cartridge 84 in response to movement of the carrier 220 from the stop mode to the run mode position. Specifically, the film drive includes a turntable drive 230 which is shiftable into driving engagement with the turntable 100 and a transport drive 232 which is shiftable into driving engagement with the film-transport sprocket 106 (see FIGS. 8 and 9). The turntable drive 230 is seen to include a drive shaft 230a which is journalled on the carrier 220 for rotation about a turntable drive axis and carries a bevel gear 230b which is shiftable through cutout 166b in the chassis plate 166 into engagement with a complementary female coupling 234 coaxially of and secured to the turntable 100. The complementary female coupling 234 is accessible through the underside of the cartridge casing 86 by the provision of an appropriate cutout 96b in the bottom wall 96 (FIG. 8) which is in substantial registry with the cutout 166b in the chassis plate 166. The bevel gear 230b and coupling 234 serve as the male and female members of a clutch for imparting drive to the turntable 100 from a main drive, as will be subsequently described. It has been found to be expedient to drive the bevel gear 230b in the direction of its slippage such that if there is any obstruction to the free feed of the film about the cartridge during projector operation, the clutch will slip and thereby avoid film breakage.

The transport drive 232, which is seen best in FIGS. 6, 15 and 16 likewise includes a drive shaft 232a and a bevel gear 232b which are journalled on the carrier 220 for rotation about an axis entering coaxially with the sprocket 106. The bevel gear 232b is shiftable into engagement with a complementary female coupling 106c formed in the underside of the sprocket 106, as seen best in FIGS. 15 and 16.

The turntable drive shaft 230a and the film-transport drive shaft 232a are coupled together by respective pulleys 236, 238 which are engaged by a coupling belt 240. The pulley diameters are selected to establsh the requisite drive ratios for the turntable 100 and sprocket 106, respectively. In this illustrative embodiment, the sprocket drive shaft 230a is driven from the shutter mechanism which will now be described.

The shutter mechanism (see FIG. 9), which is generally designated by the reference numeral 242, is of substantially conventional construction and is seen to include a shutter wheel 244 carried on a shutter wheel shaft 246 which extends vertically and parallel to the drive shafts 230a, 232a. The shutter wheel 244 is adapted to be driven at its rim 244a and is formed with the usual shutter windows 244b which move alternately into position in the optical path between the mirror 198 and the film gate 114. Additionally, the shutter mechanism 244 includes a feed claw 248 which is pivoted at a vertical claw shaft 250. In turn, the claw shaft 250 is carried on a frame-control lever 252 which has a pivot 254 on the carrier 220. The feed claw 248 is actuated from the shutter mechanism to move in a four motion feed path so that the claw fingers 248a will move upwardly through cutout 166a in the chassis plate 166 and the registering cutout 96c (FIG. 8) into engagement with the sprocket holes of the film being fed through the film gate 114, move through a forward or feeding stroke, then retract and move through a return stroke to relocate for the next film-feeding sequence. The feed claw 248 includes a two-faced cam follower 248b having one face riding on the end surface of a first cam 256 secured centrally of the shutter wheel 244 (see FIG. 9) and the other face riding on the radial cam surface of a second cam 258 projecting upwardly from the first cam 256 and secured centrally of the shutter wheel 244 (see FIG. 6). A hold-down spring 260 bears against the feed claw 248 to urge the cam follower 248b against the cam 256, while a coil spring 262 is connected to the feed claw 248 and anchored on the carrier 220 (see FIG. 6) to bias the cam follower 248b against the cam 258. The foregoing shutter assembly is substantially conventional and subject to modification and change.

Figure 5:
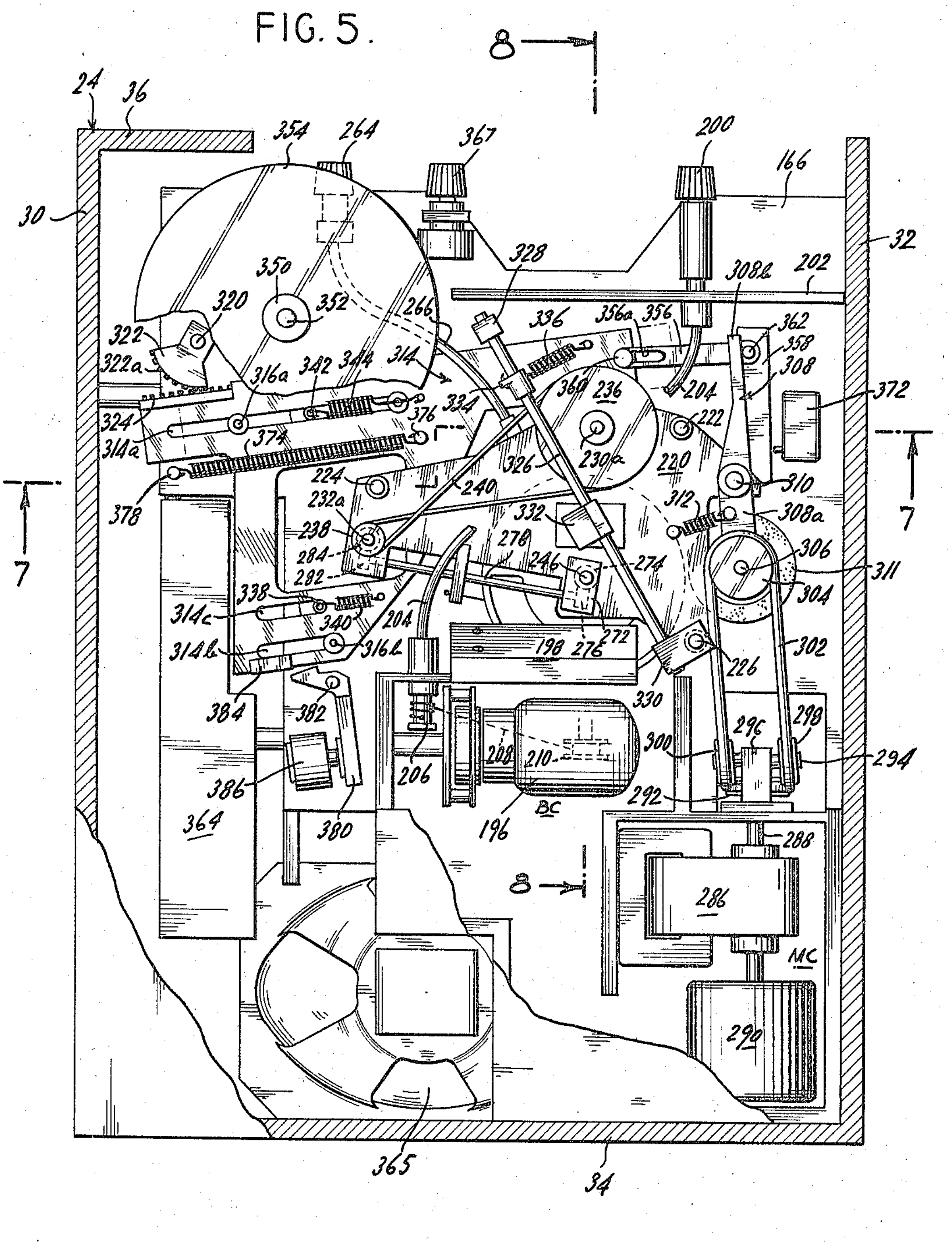
FIG. 5 is a bottom plan view through the carrying case, with parts broken away and sectioned showing details of the internal mechanisms within such carrying case.

The frame-control lever 252 may be adjusted about the pivot 254 to adjust the feed claw 248 relative to the film by the provision of a frame control knob 264 (see FIG. 5). The knob 264 is coupled via a flexible cable 266 to a lead screw 268 (see FIGS. 5 and 6) which is in threaded engagement with a follower 270 secured to the lever 252. Thus, upon adjustment of the frame control knob 264, the lever 252 may be rocked about its pivot 254 to orient the film claw pivot 250 and thereby adjust the feed claw 248 such that successive frames of film will be properly framed in the film gate aperture.

The driven shutter wheel 244 of the shutter mechanism 244 is connected to the film drives 230, 232 for imparting driving movement thereto. This is achieved by the provision of a worm gear housing 272 which is secured to the carrier 220 and receives the end of the shutter wheel shaft 246. The shutter wheel shaft 246 carries a driving worm 274 engaging a driven worm gear 276 which is on an angularly-extending coupling shaft 278 shaft 278 extending from a location beneath the carrier 220 at the shutter drive shaft 246 to a location above the carrier 220 at the sprocket drive shaft 232 (see FIGS. 5 and 6). At its end remote from the housing 272, the coupling shaft 278 extends into a further worm gear housing 280 wherein worm and worm gears 282, 284 complete the driving connection from the shutter mechanism to the sprocket drive shaft 232a and thence via the belt and pulley coupling 236, 238, 340 to the turntable drive shaft 230a. Thus, in response to drive of the shutter mechanism 242, there is a coordinated drive of the turntable 100, the film-transport sprocket 106 and the film-feeding claw 248.

The shutter wheel 244 of the shutter mechanism 242 is rim driven, as seen best in FIGS. 5 and 6 and in the diagrammatic showings of FIGS. 15 and 16, from a main electric motor 286 which is housed within the carrying case in a combined motor and blower compartment MC and is energized from a 110 volt AC source. The motor 286 has its motor shaft 288 extending in opposite directions therefrom, with the motor shaft 288 being arranged horizontally and at right angles the shutter wheel shaft 246, the turntable shaft 230a and the sprocket drive shaft 232a. The motor shaft 288 drives a blower 290 which is housed within the compartment MC, there being an air outlet 38a (see FIG. 6) cut in the top panel 38 in communication with the compartment MC for the egress of air therefrom. An air flow is thereby established to withdraw heat from the bulb compartment BC, with relatively cool air at ambient temperature entering the bulb compartment from below the cartridge-receiving chamber 168. The motor shaft 288 extends in the opposite direction from the blower 290 through the partition which define the compartment MC and carries a drive pulley 292. Disposed forwardly of the drive pulley 292 and extending at an angle relative to the motor shaft 288 is an auxiliary pulley shaft 294 which is journalled in bearing 296. The auxiliary pulley shaft 294 carries direction-change pulleys 298, 300. Trained about the pulleys 292, 298, 300 is a driving belt 302, which after passage about pulleys 298, 300, extends substantially in a horizontal plane and about a driven pulley 304. Pulley 304 is journalled on a pulley shaft 306 mounted on a rocker lever 308 pivoted on the carrier 220 at rocker shaft 310. Coaxial with the driven pulley 304 is a rubber-faced drive wheel 311 which is in coplanar relation with the rim 244a of the shutter wheel 244. A spring 312 (see FIG. 5) is operatively connected to the rocker lever 308 and to the carrier 220 and serves to normally bias the rubber-faced drive wheel 311 against the rim of the shutter wheel 244. Provision is made, as will be described hereinafter, to engage the arm 308b of the rocker lever 308 to hold the drive wheel 311 out of contact with the shutter wheel 244. When released, the spring 312 will urge the drive wheel 311 into rim-driving engagement with the shutter mechanism to complete a driving chain from the motor through the right-angle pulley arrangement 298, 300, 304. The described drive arrangement enables the most effective utilization of the space within the base 24 of the carrying case 22; and in turn, using the shutter mechanism to power the cartridge drives 230, 232 affords a compact and convenient way for deriving from a single motor, and by relatively simple physical arrangement, the necessary power takeoffs.

The common control for the projector includes a unified (in that it exercises combined control over several functions) main control member or slide plate 314 (FIGS. 5 and 6) which is interposed between the chassis plate 166 and the carrier 220 and is movable through a control traverse in response to manipulation of the control handle 218 from a stop mode position into a run mode position wherein the run mode of the projector 20 is initiated. In response to the movement of the main control member 314 through such control traverse, the carrier 220 is shifted from its stop mode position into its run mode position to engage the drives 230, 232 and the film claw 248, the loop-forming fingers 126, 130 are retracted from the film path through the cartridge, the film-distending carriage 308 is actuated to orient the film in sound-reproducing relation to the pickup means external to the cartridge, the drive wheel 311 of the main drive is permitted to move into rim-driving engagement with the shutter wheel 244 and the electrical circuits are completed. The control member 314 is configurated and positioned such that it will not interfere with the several functions to be achieved by the carrier 220 and is suspended from the chassis plate 166 by the plural guide pins, such as pins 316a, 316b which are engaged within corresponding slots 314a, 314b formed in the control member 314. The control handle 218, which moves in slot 38b in the top wall 38 (see FIGS. 1, 5 and 6), moves the main control member 314 through its control traverse via a control lever 319 which is operatively connected to a pinion shaft 320. Shaft 320 carries a pinion 322 (FIG. 5) which underlies the chassis plate 166 and is in substantial coplanar relation with the slidable control member 314. The pinion 322 includes a pinion segment 322a which engages a rack 324 on the control member 314 for moving the control member through the control traverse from the stop mode position to the run mode position.

The several control functions achieved by the movement of the control member 314 can be best appreciated by concurrent reference to FIGS. 15 and 16, and the detailed showings of FIGS. 5 to 10 inclusive. The control member 314 shifts the carrier 220 into its run mode position by the actuation of a cam shaft 326 (see FIGS. 7 to 9 inclusive) which is journalled on the chassis plate 166 by appropriate bearing blocks 328, 330 (see FIG. 5). The cam shaft 326 underlies the carrier 220 and has a cam 332 which is configurated to lift the carrier 220 into the run mode position in response to limited arcuate movement being imparted to cam shaft 326. Such arcuate movement is imparted to the cam shaft 326 by an actuating lever 334 which is coupled by a flexible connecting link in the form of a spring 336 to the control member 314. The use of the flexible connecting link 336 permits the carrier-shift function to be achieved, yet does not interfere with the continued movement of the control member 314 through its control traverse for its several additional and related functions. Thus, as the control member 314 is translated toward the right in the bottom plan view of FIG. 5 and response to turning of the pinion segment 322*a* in the counterclockwise direction about pinion shaft 320, a force is transmitted via the flexible connecting link or spring 336 to the lever arm 334 which turns the cam shaft 326 in a direction appropriate to lift the carrier 220 into its run mode position illustrated in FIG. 9. As seen best in FIGS. 8 and 9, the chassis plate 166, apart from the several cutouts required to permit access to the mechanisms within the cartridge, is relieved such that there can be maximum packing or density of the components beneath the chassis plate to achieve a corresponding reduction in the overall height of the mechanisms thereby providing an exceptionally compact, portable structure.

In timed relation to the shift of the carrier 220 to its run mode position, the control member 314 retracts the loop-forming fingers 126, 130 within the cartridge that has been inserted in the chamber 168. The retraction of the loop-forming fingers 126, 130 is achieved by an actuating pin 338 (FIG. 6) which projects upwardly through a cutout 166*c* in the chassis plate 166 and to one side of the cartridge. The actuating pin 338 is in position to enter cutouts in the adjacent wall and the underside of the cartridge casing 86 to contact the actuator 126*c* on finger 126. Thus, as the control member 314 moves substantially from right to left in FIG. 6 (and in FIG. 10), the actuating pin 338 contacts the actuator 126*c* to shift the loop-forming finger 126 in the clockwise direction about the pivot 128 from the full line position illustrated in FIG. 10 to the retracted position. Concurrently, via the connecting link 134, the finger 130 is shifted in the clockwise direction about pivot 132 into its corresponding retracted position. Actuator 126*c* is disposed below the level at which the film passes about the finger 126 and, in turn, the actuating pin 338 is in the same plane as actuator 126*c* to avoid any possible interference with the movement of the film.

The actuating pin 338 is received within a slot 314*c* (see FIG. 5) formed in the control member 324 and is held against one end wall of the slot by a spring 340 which is anchored on the control member 314. Accordingly, after the actuating pin 338 has achieved its control function within the cartridge 84, the control member 314 is capable of continuing its controlled traverse, with the spring mounted pin 338 and slot 314*a* affording a lost motion connection between the pin 338 and the control member 314.

The film-distending carriage 308 is actuated by pin 432 (FIG. 5) which projects upwardly through a cutout 166*d* in the chassis plate 166 to one side of the cartridge 84 and is in position to enter a corresponding cutout in the adjacent wall and the underside of the cartridge casing (see FIG. 10). Actuating pin 342 (FIGS. 6 and 10) contacts the actuator 146*a* of the film-distending carriage 146. Thus, as the control member 314 translates from right to left in FIG. 6 (and FIG. 10), the actuating pin 342 contacts the actuator 146*a* to rock the film-distending carriage 146 about the carriage pivot 148 from the full line position illustrated in FIGS. 10 and 15 to the broken line position illustrated in FIG. 10 (and illustrated diagrammatically in FIG. 16) to orient the film F in sound-reproducing relation to the sound-reproducing means external to the cartridge. The actuating pin 342 is received within a slot 314*a* formed in the control member 314 and is biased toward one end wall of the slot by a spring 344 which is anchored on the control member 314. After the actuating pin 342 has achieved its control function within the cartridge, the control member 314 is capable of continuing its control traverse, with the spring 344, pin 342 and slot 314*a* affording a lost motion connection between the pin 342 and the control member 314.

As seen best in FIGS. 6 and 10, the magnetic sound pickup head 346 is positioned to one side of the cartridge-receiving chamber 168 opposite the cutout 94*a* in the wall 94 of the cartridge casing 86 and is in position to have the film F brought into bearing engagement therewith by the outward displacement of the carriage 146 and its rollers 150, 154. Adjacent to the pickup head 346 (which is of conventional construction and of the type employed in tape recorders and like magnetic-to-audio reproducing devices), is the capstan 348 which is journalled in a bearing 350. The capstan extends into a flywheel shaft 352 (see FIG. 5) which carries a flywheel 354 which lies beneath the chassis plate 166 and the control member 314. During playback of the magnetic sound track, the rubber-faced roller 150 bears against the capstan and cooperates with the damping subassembly 160, 162 to assure uniform movement of the film past the pickup head 346 and corresponding high fidelity reproduction of the studio information recorded on the magnetic sound track of film F.

Still further, the control member 314 is effective (after the shift of the carrier 220 to its run mode position, disengagement of the loop-forming fingers 126, 130 and engagement of the audio playback system) to release the drive wheel 311 for movement under the influence of spring 312 into rim-driving engagement with the shutter wheel 244. As seen best in FIGS. 5, 15 and 16, the forward end of the control member 314 is operatively connected by an actuating link 356 to an actuating lever 358 which is pivoted on the carrier 320 coaxially of the lever 308 at pivot 310. Link 356 is coupled to the control member 314 by a pin 360 which is received within an elongated slot 356*a* in the link 356. The opposite end of the link 356 is connected by a pin 362 to the actuating lever 358. The pin 362 is of a length and is positioned to bear against the arm 308*b* of lever 308 to hold the same (against the bias of spring 312) in a position wherein the drive wheel 311 is out of engagement with the shutter wheel 244. As the control member 314 completes its control traverse, the pin 362 moves clear of the arm 308*b* thereby enabling the spring 312 to establish a driving relation between the drive roller 311 and the shutter wheel 244.

In this illustrative embodiment, provision is made in response to the movement of the control member 314 into its run mode position for completing the energization circuit for the motor 296 and the amplifier 364 associated with the magnetic pickup head 346. The amplifier includes a volume control knob 367 accessible through door 36*a*. The amplifier 364 requires no detailed description since it is subject to a wide variation of latitude and change, it being sufficient to note the audio amplifier receives an audio input from the magnetic pickup head 346 and applies its output to a speaker 365 (FIG. 6). The speaker is housed within the base 24 of the carrying case 22 beneath the top wall 38 thereof, with the latter being provided with a speaker grille 366 overlying the speaker 365.

Referring specifically to FIGS. 15 and 16, it will be seen that the alternating current input lines 368, 370 are connected respectively to the energization circuits for the motor 286, the amplifier 364 and the lamps 196. In line 370, there is provided a microswitch 372 (see also FIG. 5) which is in position to be closed by the actuating lever 358 as the control member 314 moves into its run mode position. Closing of the microswitch 372 completes the energization circuits for the motor 286, the amplifier 364 and the lamp 196.

The control member 314 is normally biased into its stop mode position by a spring 374 (see FIG. 5) which is operatively connected to the control member at pin 376 and anchored on chassis plate by stud or pin 378. Provision is made in response to completion of the control traverse of the control member 314 for releasably securing the control member in its run mode position. Specifically, and as seen best in FIGS. 5, 15 and 16, a latch 380 is pivoted on the chassis plate at latch pivot 382 in position to engage a keeper 384 on the control member 314. The latch 380 is biased and arranged to releasably lock the control member in its run mode position when the nose of the latch 380 engages keeper 384, and arm 380 is held in position by solenoid 386. When solenoid 386 is deenergized by switch 388 the keeper 384 is released and the spring 374 restores the control member 314 to its stop mode position. As seen in FIGS. 15 and 16, the energization coil 386*a* of the solenoid is connected via a control push button 388 (see also FIGS. 1 and 6) across lines 368, 370. Thus, upon the operator depressing the push button 388, the energization circuit for the coil 386*a* of the solenoid 386 is disrupted whereby the latch 380 is retracted to enable the control member 314 to return to its stop mode position. This brings about a corresponding movement of the carrier 220 to its stop mode position, retraction of the film-distending carriage 144, and reestablishment of the free loops before and after the film gate 114 by virtue of the action of the loop-forming fingers 126, 130.

For a better understanding of the present invention, reference will now be made to a typical sequence of operations:

The collapsible screen 28 is erected as previously described in connection with FIGS. 1 to 4 and 7 to the working position illustrated in FIGS. 1 and 7. Thereupon, the cartridge 84 is inserted through the open door 36*a* into the cartridge-receiving chamber 168. Incident to the insertion of the cartridge 84 to its operative position as established by the several referencing means 170, 172, 180 etc., the film gate 114 is adjusted both vertically and laterally and the film F is precisely located in the film gate by the guiding influence of the reference pins 194*c*, 192*c*. After insertion of the cartridge 84, the hinged door 36*a* is left open to permit access by the machine operator to the focus knob 200, the framing control knob 264, and the volume control knob 367. Thereupon, the machine is ready to operate. Operation is initiated by the operator pulling the control handle 218 forwardly through its arcuate traverse which turns the pinion shaft 320 and pinion 322 in the clockwise direction (when viewed from above). This moves the control member 314 through its control traverse, moving substantially from right to left in FIG. 6 which initiates all of the coupling and control functions necessary to place the projector 20 into operation. This causes the vertical shift of the carrier 220 to complete respective driving connections to the turntable 100 and to the film-transport sprocket 106 and brings he film claw 248 into position for imparting intermittent motion to the film F as the latter passes through the film gate 114. It will be appreciated that the free loops of film F before and after the film gate 114 were previously established by the action of the loop-forming fingers 126, 130 which normally are biased to the operative position by spring 136. Concurrent with the aforesaid controls initiated by displacement of the carrier 220, the loop-forming fingers 126, 130 are retracted to a clearance position wherein they will not interfere with the transport of the film about the cartridge in the endless loop L and the film-distending carriage 146 is swung to its operative position wherein the film is moved externally of the cartridge and into engagement with the magnetic pickup head 346 and the capstan 348. As the final portion of the control traverse occurs, the drive roller 311 is moved into driving engagement with the rim 244*a* of the shutter, the motor 286 is energized, the amplifier 364 is energized and the control member 314 is latched in its running position.

It is but a simple matter for the machine operator to then make the necessary adjustments of focus, framing and volume by manipulation of the control knobs 200, 264 and 367. In a matter of seconds from the time the cartridge 84 is inserted into the cartridge-receiving chamber and the control handle 218 is moved to the operating position a well defined and well focused image is displayed on the screen accompanied by the audio derived from the magnetic sound track on the film.

The film is projected on a continuous basis and will repeat itself until the machine operator elects to terminate the projector operation. Termination is achieved by the simple expedient of depressing the push button 388 which is located adjacent the control handle 218. When the button 388 is depressed, the solenoid is deenergized, latch 380 releases the control member 314 for restoration to its stop mode position by spring 374. As the control member 314 makes its reverse stroke, the pin 362 on actuating lever 358 rocks the lever 308 to a position wherein the drive wheel 311 is moved out of engagement with the shutter wheel 244. Switch 372 is opened and disrupts the energization circuits for the motor 286, amplifier 364 and lamp 196. Continued reverse traverse of the control member 314 moves the carrier 220, the turntable drive 230, the transport drive 232 and the film claw 248 to clearance positions relative to the cartridge 84. At substantially the same time, the actuating pins 338, 342 move out of the cartridge 84 whereupon the loop-forming fingers 126, 130 are restored to their operative positions along the film course and the film-distending carriage 146 recedes into the cartridge. The loop-forming fingers thereupon readjust the film relative to the film gate 114, thereby conditioning the cartridge for the next playback of the film contained therein. The cartridge is free of all connection to the projector mechanisms enabling the same to be withdrawn from the cartridge-receiving chamber. In a matter of seconds, the machine operator can place a new cartridge into the chamber and initiate the operation of the projector mechanisms by manipulation of the control handle 218. Virtual instantaneous changeover from cartridge to cartridge enables the machine operator to make a continuous audio-visual presentation with substantially no loss in continuity to the viewer or viewers of such presentation as might be occasioned if it was necessary to rewind the exhibited film and thread the new film through projector mechanisms or to make extensive new setup procedures.

What I claim is:

1. In a cartridge-loaded motion picture projector having a run mode and a stop mode, a removable cartridge including a turntable adapted to support an endless coil of film, film-transport means within said cartridge to unwind film from said turntable, pass the film in an endless loop along a prescribed course through said cartridge and return the film to said turntable and a film gate along said course, said projector comprising a cartridge-receiving chamber adapted to receive said cartridge, a carrier shiftable relative to said chamber from a stop mode position to a run mode position, a turntable drive mounted on said carrier and shiftable into driving engagement with said turntable, a transport drive mounted on said carrier and shiftable into driving engagement with said film-transport means, means coupling said turntable and transport drives together, a film claw mounted on said carrier and shiftable into an operative position relative to said film gate to engage said sprocket holes for the frame by frame advance of said film, a shutter mechanism mounted on said carrier and shiftable relative to said chamber, means coupling said shutter mechanism to one of said turntable and transport drives for imparting driving movement thereto, claw-actuating means controlled by said shutter mechanism for actuating said film claw, a main drive shiftable into driving relation with said shutter mechanism for timed drive of said shutter mechanism, film claw and turntable and transport drives, and a common control operable when said cartridge is in said chamber for shifting said turntable and transport drives into engagement with said turntable and film-transport means respecitvely, for shifting said film claw into said operative position and for engaging said main drive, said common control including a main control member movable through a control traverse to initiate said run mode and actuating means operable by said control member to shift said carrier from said stop mode position to engage said turntable drive and to shift said film claw into said operative position and for engaging said main drive with said shutter mechanism.

2. A motion picture projector according to claim 1 including means responsive to the completion of said control traverse of said control member for releasably securing said control member in its run mode position.

3. In a cartridge-loaded motion picture projector having a run mode and a stop mode, a removable cartridge adapted to support an endless coil of film, film-transport means within said cartridge to unwind said film, pass the film along a prescribed course through said cartridge and return the film to said coil, a film gate along said course, said projector comprising a cartridge-receiving chamber adapted to receive said cartridge, a shiftable carrier external to said chamber, drive mechanisms including a transport drive on said carrier and shiftable into driving engagement with said film-transport means, a film claw on said carrier and shiftable into an operative position relative to said film gate and control means having a single manually actuated control operable when said cartridge is in said chamber for shifting said carrier to move said transport drive into engagement with said film-transport means and to move said film claw into said operative position.

4. In a cartridge-loaded motion picture projector having a run mode and a stop mode, a removable cartridge including a turntable adapted to support an endless coil of film provided with image frames and sprocket holes, film-transport means within said cartridge to unwind film from said turntable, pass the film in an endless loop along a prescribed course through said cartridge and return the film to said turntable, a film gate along said course and loop-forming means along said course and adapted to engage said film for adjusting the same relative to said film gate, said projector comprising a cartridge-receiving chamber adapted to receive said cartridge, a carrier shiftable relative to said chamber from a stop mode position to a run mode position, a turntable drive mounted on said carrier and shiftable into driving engagement with said turntable, a transport drive mounted on said carrier and shiftable into driving engagement with said film-transport means. means coupling said turntable and transport drives together, a film claw mounted on said carrier and shiftable into an operative position relative to said film gate to engage said sprocket holes for the frame by frame advance of said film, a shutter mechanism mounted on said carrier and shiftable relative to said chamber, means coupling said shutter mechanism to one of said turntable and transport drives for imparting driving movement thereto, claw-actuating means controlled by said shutter mechanism for actuating said film claw, a main drive shiftable into driving relation with said shutter mechanism for timed drive of said shutter mechanism, film claw and turntable and transport drives, and a common control operable when said cartridge is in said chamber for shifting said turntable and transport drives into engagement with said turntable and film-transport means respectively, for shifting said film claw into said operative position, for retracting said loop-forming means from said course and for engaging said main drive, said common control including a main control member movable through a control traverse to initiate said run mode and respective actuating means operable by said control member to shift said carrier from said stop most position to engage said turntable and transport drive and to shift said film claw into said operative position, for retracting said loop-forming means from said course during said run mode and for shifting said main drive into driving relation to said shutter mechanism.

5. In a cartridge-loaded motion picture projector having a run mode and a stop mode, a removable cartridge including a turntable adapted to support an endless coil of film provided with image frames, sprocket holes and a sound track, film-transport means within said cartridge to unwind film from said turntable, pass the film in an endless loop along a prescribed course through said cartridge and return the film to said turntable, a film gate along said course, loop-forming means along said course and adapted to engage said film for adjusting the same relative to said film gate, and film-distending means along said course, said projector comprising a cartridge-receiving chamber adapted to receive said cartridge, a carrier shiftable relative to said chamber from a stop mode position to a run mode position, a turntable drive mounted on said carrier and shiftable into driving engagement with said turntable, a transport drive mounted on said carrier and shiftable into driving engagement with said film-transport means, means coupling said turntable and transport drives together, a film claw mounted on said carrier and shiftable into an operative position relative to said film gate to engage said sprocket holes for the frame by frame advance of said film, a shutter mechanism mounted on said carrier and including a shutter wheel adapted to be rim driven, means coupling said shutter wheel to one of said turntable and transport drives for imparting driving movement thereto, claw-actuating means controlled by said shutter mechanism for actuating said film claw, a main drive shiftable into rim driving engagement with said shutter wheel for timed drive of said shutter wheel, film claw and turntable and transport drives, a pickup head external to said chamber and a common control operable when said cartridge is in said chamber for shifting said turntable and transport drives into engagement with said turntable and film-transport means respectively, for shifting said film claw into said operative position, for retracting said loop-forming means from said course, for actuating said film-distending means to orient said film external to said cartridge and in sound-reproducing relation to said pickup head and for engaging said main drive, said common control including a main control member movable through a control traverse to initiate said run mode, first actuating means operable by said control member to shift said carrier from said stop mode position to engage said turntable and transport drive and to shift said film claw into said operative position, second actuating means operable by said control member and movable into said cartridge for retracting said loop-forming means from said course during said run mode, third actuating means operable by said control member for actuating said film-distending means to orient said film in sound-reproducing relation to said pick-up head, and fourth actuating means operable by said control member to shift said main drive into engagement with said shutter wheel.

6. In a cartridge-loaded motion picture projector having a run mode and a stop mode, a removable cartridge including a turntable adapted to support an endless coil of film, film-transport means within said cartridge to unwind film from said turntable, pass the film in an endless loop along a prescribed course through said cartridge and return the film to said turntable and a film gate along said course, said projector comprising a cartridge-receiving chamber adapted to receive said cartridge, a carrier shiftable relative to said chamber from a stop mode position to a run mode position, a film drive mounted on said carrier and shiftable into driving engagement with said turntable and said film-transport means, a film claw mounted on said carrier and shiftable into an operative position relative to said film gate to engage and advance said film, a shutter mechanism mounted on said carrier, means coupling said shutter mechanism to said film drive for imparting driving movement thereto, claw-actuating means controlled by said shutter mechanism for actuating said film claw, a main drive including an electric motor having an energization circuit and shiftable into driving engagement with said shutter mechanism and a common control operable when said cartridge is in said chamber for engaging said film drive, for shifting said film claw into said operative position and for engaging said main drive, said common control including a main control member movable through a control traverse into a run mode position to initiate said run mode, respective actuating means operable by said control member to shift said carrier into said run mode position and to shift said main drive into driving engagement with said shutter mechanism, means operable in response to movement of said control member into said run mode position for completing the energization circuit for said electric motor, a releasable latch for said control member, means operable in response to movement of said control member into said run mode position for engaging said releasable latch, and means conrollable by the projector operator for disengaging said latch whereby said control member and said carrier are returned to their respective stop mode positions.

7. In a cartridge-loaded motion picture projector having a run mode and a stop mode, a removable cartridge including a turntable adapted to support an endless coil of film provided with image frames, sprocket holes and a magnetic sound track film-transport means within said cartridge to unwind film from said turntable, pass the film in an endless loop along a prescribed course through said cartridge and return the film to said turntable, a film gate along said course and film-distending means along said course, said projector comprising a cartridge-receiving chamber adapted to receive said cartridge, a carrier shiftable relative to said chamber from a stop mode position to a run mode position, a film drive mounted on said carrier and shiftable into driving engagement with said turntable and said film-transport means, a film claw mounted on said carrier and shiftable into an operative position relative to said film gate to engage said sprocket holes for the frame by frame advance of said film, a shutter mechanism mounted on said carrier, means coupling said shutter mechanism to said film drive for imparting driving movement thereto, claw-actuating means controlled by said shutter mechanism for actuating said film claw, a main drive including an electric motor having an energization circuit and shiftable into driving engagement with said shutter mechanism, a magnetic pickup head external to said chamber, an amplifier connected to said pickup head and having an energization circuit and a common control operable when said cartridge is in said chamber for engaging said film drive, for shifting said film claw into said operative position, for actuating said film-distending means to orient the magnetic sound track of said film external to said cartridge and in sound-reproducing relation to said pickup head and for engaging said main drive, said common control including a main control member movable through a control traverse into a run mode position to initiate said run mode, respective actuating means operable by said control member to shift said carrier into said run mode position, to actuate said film-distending means for orienting said film in sound-reproducing relation to said pickup head, and to shift said main drive into driving engagement with said shutter mechanism, means operable in response to movement of said control member into said run mode position for completing the respective energization circuit for said electric motor and for said amplifier, a releasable latch for said control member, means operable in response to movement of said control member into said run mode position for engaging said releasable latch, and means controllable by the projector operator for disengaging said latch whereby said control member and said carrier are returned to their respective stop mode positions.

8. In a cartridge-loaded motion picture projector having a run mode and a stop mode, a removable cartridge including a turntable adapted to support an endless coil of film provided with image frames, sprocket holes and a magnetic sound track, film-transport means within said cartridge to unwind film from said turntable, pass the film in an endless loop along a prescribed course through said cartridge and return the film to said turntable, a film gate along said course, loop-forming means along said course and adapted to engage said loop for adjusting the same relative to said film gate and film-distending means along said course, said projector comprising a cartridge-receiving chamber adapted to receive said cartridge, a carrier shiftable relative to said chamber from a stop mode position to a run mode position, a film drive mounted on said carrier and shiftable into driving engagement with said turntable and said film-transport means, a film claw mounted on said carrier and shiftable into an operative position relative to said film gate to engage said sprocket holes for the frame by frame advance of said film, a shutter mechanism mounted on said carrier, means coupling said shutter mechanism to said film drive for imparting driving movement thereto, claw-actuating means controlled by said shutter mechanism for actuating said film claw, a main drive including an electric motor having an energization circuit and shiftable into driving engagement with said shutter mechanism, a magnetic pickup head external to said chamber, an amplifier connected to said pickup head and having an energization circuit and a common control operable when said cartridge is in said chamber for engaging said film drive, for shifting said film claw into said operative position, for retracting said loop-engaging means from said course, for actuating said film-distending means to orient the magnetic sound track of said film external to said cartridge and in sound-reproducing relation to said pickup head and for engaging said main drive, said common control including a main control member movable through a control traverse into a run mode position to initiate said run mode, respective actuating means operable by said control member to shift said carrier into said run mode position, to retract said loop-engaging means from said course, to actuate said film-distending means for orienting said film in sound-reproducing relation to said pickup head, and to shift said main drive into driving engagement with said shutter mechanism, means operable in response to movement of said control member into said run mode position for completing the respective energization circuit for said electric motor and for said amplifier, a releasable latch for said control member, means operable in response to movement of said control member into said run mode position for engaging said releasable latch, and means controllable by the projector operator for disengaging said latch whereby said control member and said carrier are returned to their respective stop mode positions.

9. In a motion picture projector, a cartridge including a turntable adapted to support an endless coil of film, film-transport means within said cartridge for unwinding and rewinding film from said coil, a film gate adapted to receive said endless coil, cartridge drive means including a turntable drive and a film-transport drive operatively connected to said turntable and film-transport means respectively, a driven shutter mechanism arranged relative to said film gate for the projection of said film, a film feeder engaging said film in said film gate for the frame by frame advance thereof, a common shiftable carrier adapted to be moved to a run position for mounting said turntable drive, said film-transport drive, said shutter mechanism and said film feeder and respective actuating means operable by said shutter mechanism for actuating said turntable and film-transport drives and said film feeder.

10. In a motion picture projector, a cartridge including a turntable adapted to support an endless coil of film, film-transport means within said cartridge for unwinding and rewinding film from said coil, a film gate adapted to receive said endless coil, cartridge-drive means including a turntable drive and a film-transport drive operatively connected to said turntable and film-transport means respectively, a driven shutter mechanism arranged relative to said film gate for the projection of said film, a film feeder including a claw engaging said film in said film gate for the frame by frame advance thereof, respective accurating means operable by said shutter mechanism for actuating said turntable and film-transport drives and for actuating said film feeder, a main drive, and means for selectively connecting said main drive to said shutter mechanism.

11. In a motion picture projector, a cartridge including a turntable rotating about a turntable axis and adapted to support an endless coil of film, film-transport means including a sprocket rotating about a sprocket axis for unwinding and rewinding film from said coil, a film gate adapted to receive said endless coil, cartridge drive means including a turntable drive and a film-transport drive operatively connected to said turntable and film-transport means respectively, said turntable drive including a first drive shaft in axial alignment with said turntable axis and said film-transport drive including a second drive shaft in axial alignment with said sprocket axis, a driven shutter mechanism having a shutter shaft and arranged relative to said film a shiftable carrier gate for the projection of said film, said first, second and shutter shafts being in spaced parallel relation and all being mounted on said shiftable carrier, a film feeder including a claw engaging said film in said film gate for the frame by frame advance thereof and respective actuating means operable from said shutter shaft for actuating said cartridge drive means and said film feeder.

References Cited

UNITED STATES PATENTS

| | | | |
|---|---|---|---|
| 2,238,719 | 4/1941 | De Tartas | 352—72 |
| 2,279,022 | 4/1942 | Duskes | 352—128 |
| 2,434,200 | 1/1948 | Engelken | 352—8 |
| 2,624,232 | 1/1953 | Kingston | 352—83 |
| 3,139,789 | 7/1964 | Schrader | 352—72 |
| 3,176,310 | 3/1965 | Finnerty | 352—29 |
| 3,232,688 | 2/1966 | Bavaro | 352—128 |
| 3,244,470 | 4/1966 | Hennessex et al. | 352—128 |
| 3,271,095 | 9/1966 | Jensen et al. | 352—128 |

JULIA E. COINER, *Primary Examiner.*